(12) United States Patent
Borgerding et al.

(10) Patent No.: US 12,032,768 B2
(45) Date of Patent: Jul. 9, 2024

(54) SWITCH ASSEMBLY WITH FORCE-ASSOCIATED VARIABLE SCROLL SPEED AND METHODS OF USE

(71) Applicant: Joyson Safety Systems Acquisition LLC, Auburn Hills, MI (US)

(72) Inventors: Nicholas Borgerding, St. Clair Shores, MI (US); Jason Lisseman, Shelby Township, MI (US); Kevin Chrustowski, Sterling Heights, MI (US); David Andrews, Ortonville, MI (US)

(73) Assignee: Joyson Safety Systems Acquisition LLC, Auburn Hills, MI (US)

( * ) Notice: Subject to any disclaimer, the term of this patent is extended or adjusted under 35 U.S.C. 154(b) by 0 days.

(21) Appl. No.: 18/357,434

(22) Filed: Jul. 24, 2023

(65) Prior Publication Data

US 2023/0367412 A1 Nov. 16, 2023

Related U.S. Application Data

(63) Continuation of application No. 18/057,074, filed on Nov. 18, 2022, now Pat. No. 11,714,505, which is a
(Continued)

(51) Int. Cl.
*G06F 3/041* (2006.01)
*G06F 3/01* (2006.01)
(Continued)

(52) U.S. Cl.
CPC ............ *G06F 3/0414* (2013.01); *G06F 3/016* (2013.01); *G06F 3/0338* (2013.01);
(Continued)

(58) Field of Classification Search
CPC ...... G06F 3/016; G06F 3/0414; G06F 3/0338; G06F 3/0485; G06F 3/088; G06F 2203/04102; G06F 2203/04105
See application file for complete search history.

(56) References Cited

U.S. PATENT DOCUMENTS 9,372,538 B2 6/2016 Pala et al.
9,690,380 B2 6/2017 Monkhouse et al.
(Continued)

FOREIGN PATENT DOCUMENTS

WO 2012061554 A1 5/2012
WO 2016096700 A1 6/2016

OTHER PUBLICATIONS

International Search Report and Written Opinion issued for International Application No. PCT/US2018/012370, dated May 8, 2018, 20 pages.

*Primary Examiner* — Hang Lin
(74) *Attorney, Agent, or Firm* — Meunier Carlin & Curfman LLC

(57) ABSTRACT

Implementations include methods of controlling a haptic response comprising receiving a force signal from a force sensor; determining a force magnitude associated with the force signal; comparing the force magnitude with an initial threshold force amount to determine whether the force magnitude exceeds the initial threshold force amount; measuring an elapsed time that the force magnitude exceeds the initial threshold force amount; comparing the elapsed time to a minimum elapsed time; if the elapsed time being greater than the minimum elapsed time, generating a haptic feedback control signal, the haptic feedback control signal causing a haptic actuator to propagate a plurality of pressure waves at a propagation frequency, the propagation frequency being proportional to the force magnitude; and generating a scroll control signal that causes a menu system
(Continued)

to scroll through a plurality of menu options provided by the menu system at a scroll frequency associated with the propagation frequency.

20 Claims, 27 Drawing Sheets

Related U.S. Application Data continuation of application No. 15/862,428, filed on Jan. 4, 2018, now Pat. No. 11,507,214.

(60) Provisional application No. 62/442,311, filed on Jan. 4, 2017.

(51) Int. Cl.
  *G06F 3/0338* (2013.01)
  *G06F 3/0485* (2022.01)
  *G06F 3/0488* (2022.01)

(52) U.S. Cl.
  CPC .......... *G06F 3/0485* (2013.01); *G06F 3/0488* (2013.01); *G06F 2203/04102* (2013.01); *G06F 2203/04105* (2013.01)

(56) References Cited

U.S. PATENT DOCUMENTS

| | | |
|---|---|---|
| 2003/0107547 A1 | 6/2003 | Kehlstadt et al. |
| 2006/0075358 A1 | 4/2006 | Ahokas |
| 2006/0132455 A1 | 6/2006 | Rimas-Ribikauskas et al. |
| 2007/0013677 A1 | 1/2007 | Rosenberg et al. |
| 2007/0229466 A1 | 10/2007 | Peng et al. |
| 2008/0082939 A1 | 4/2008 | Nash et al. |
| 2008/0084399 A1 | 4/2008 | Chua et al. |
| 2010/0064250 A1 | 3/2010 | Schroeder et al. |
| 2011/0141052 A1 | 6/2011 | Bernstein et al. |
| 2011/0148608 A1 | 6/2011 | Grant et al. |
| 2011/0210926 A1* | 9/2011 | Pasquero ................ G06F 3/016 715/702 |
| 2011/0279381 A1* | 11/2011 | Tong ...................... G06F 3/016 345/173 |
| 2012/0105367 A1 | 5/2012 | Son et al. |
| 2013/0032002 A1 | 2/2013 | Kuntzel |
| 2013/0307789 A1 | 11/2013 | Karamath et al. |
| 2014/0218317 A1* | 8/2014 | Berg .................... G06F 3/0488 345/173 |
| 2015/0066245 A1 | 3/2015 | Lee et al. |
| 2015/0097791 A1 | 4/2015 | Lisseman et al. |
| 2015/0268725 A1* | 9/2015 | Levesque ................ G06F 3/041 345/156 |
| 2016/0062464 A1 | 3/2016 | Moussette et al. |
| 2017/0090571 A1 | 3/2017 | Bjaerum et al. |

\* cited by examiner

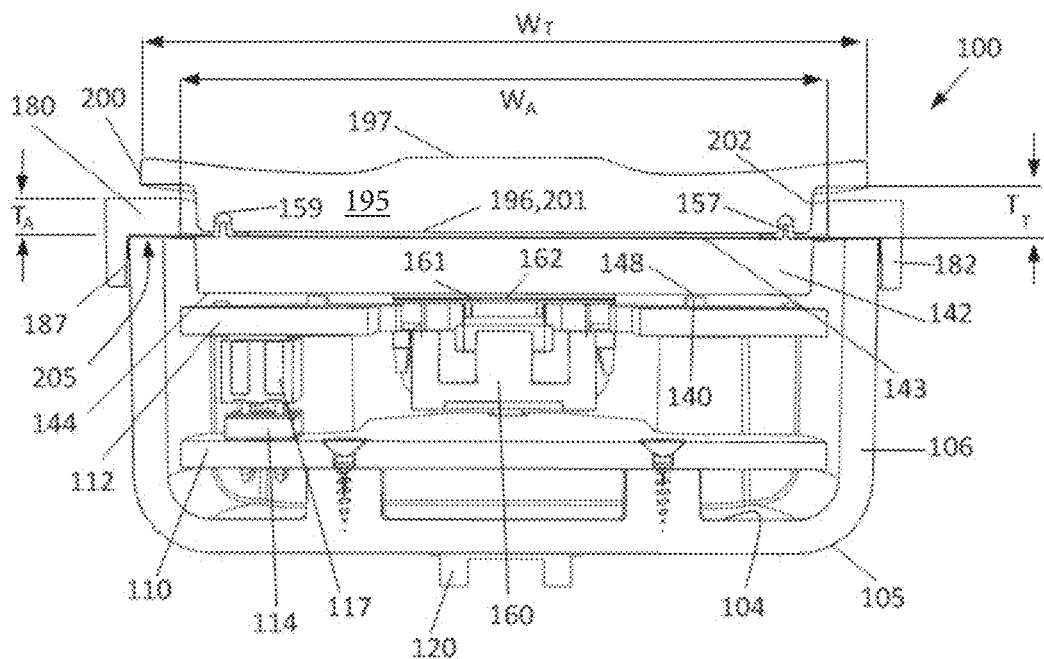
FIG. 3
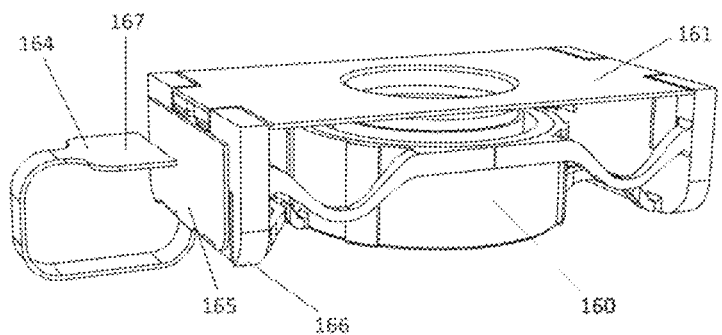
FIG. 4

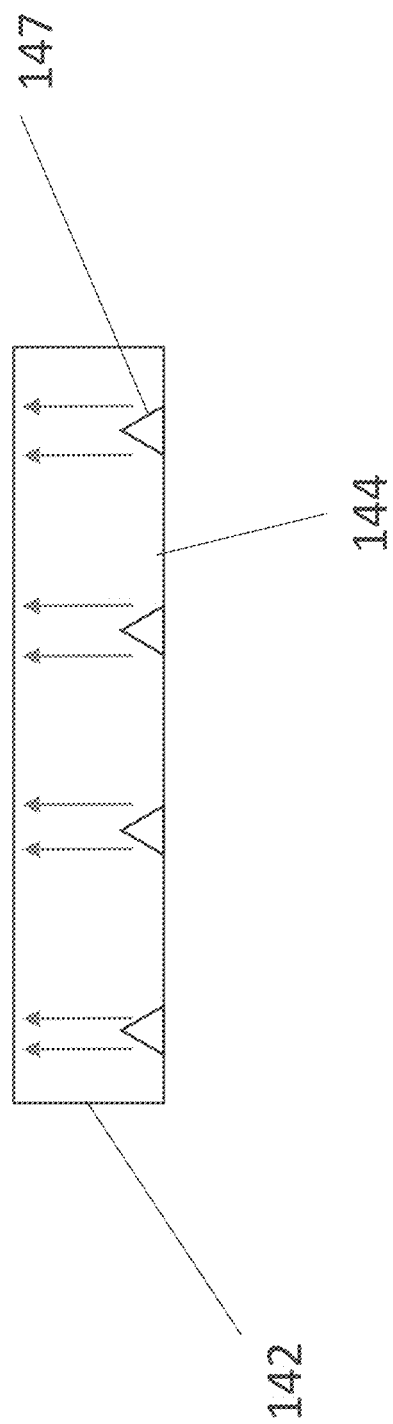

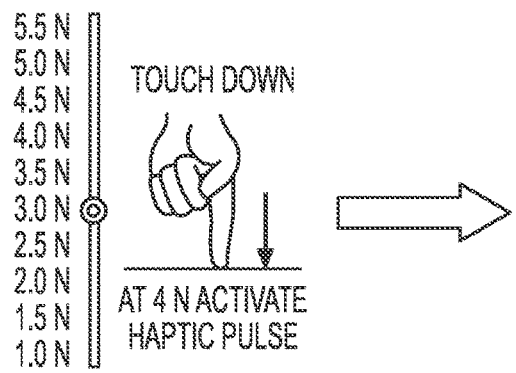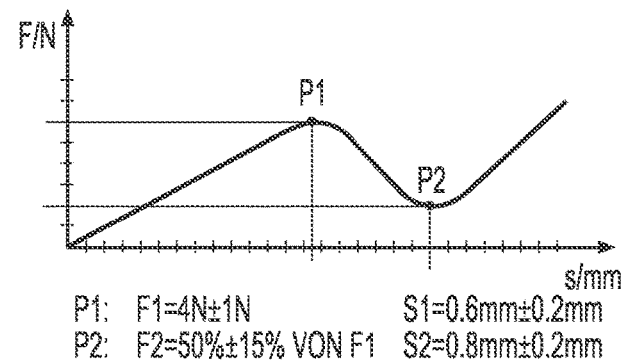
*FIG. 18A*
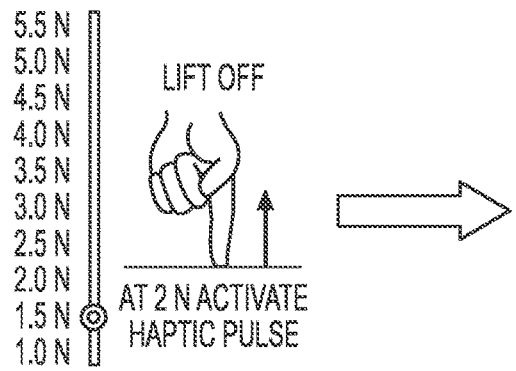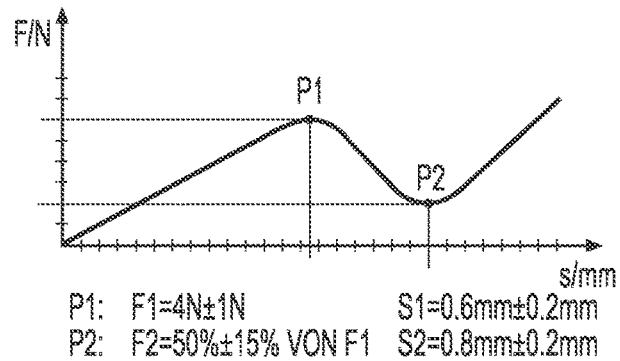
*FIG. 18B*

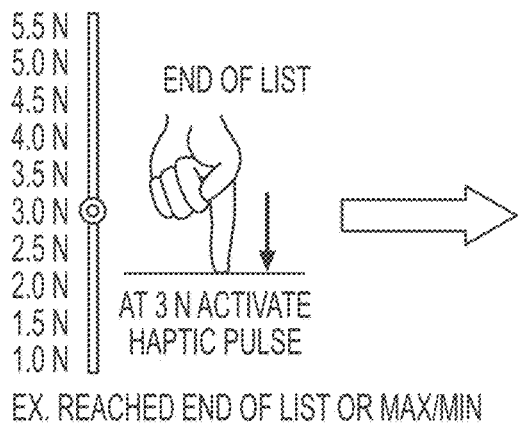 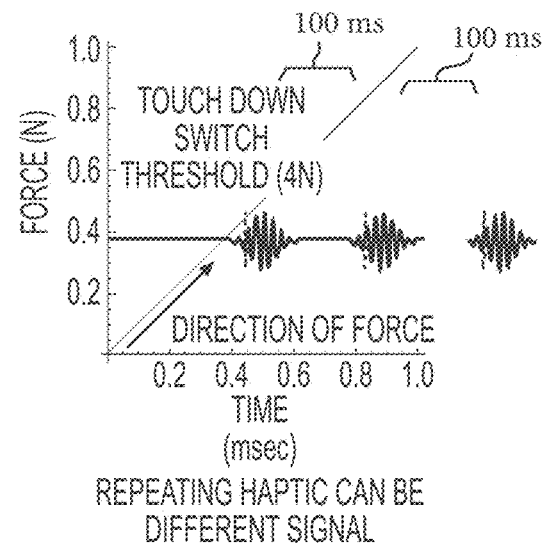
FIG. 18C
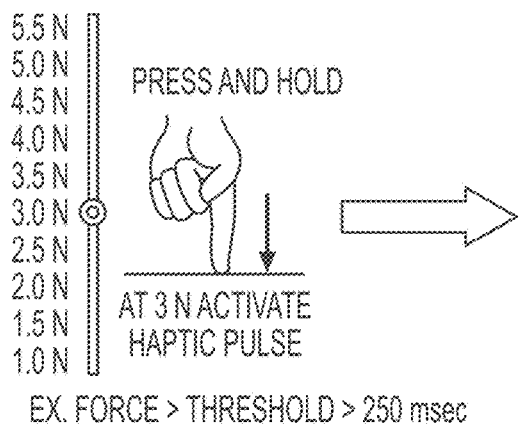 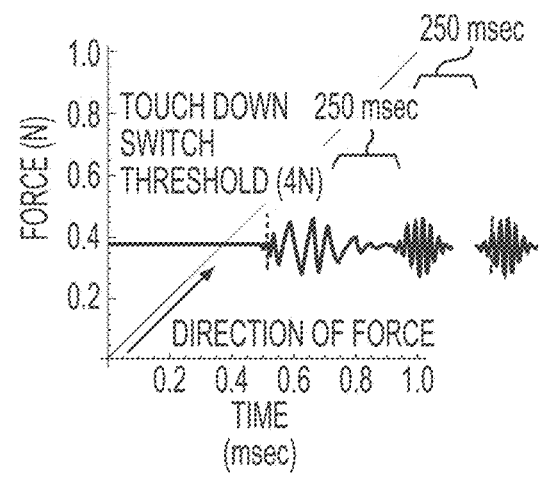
FIG. 18D

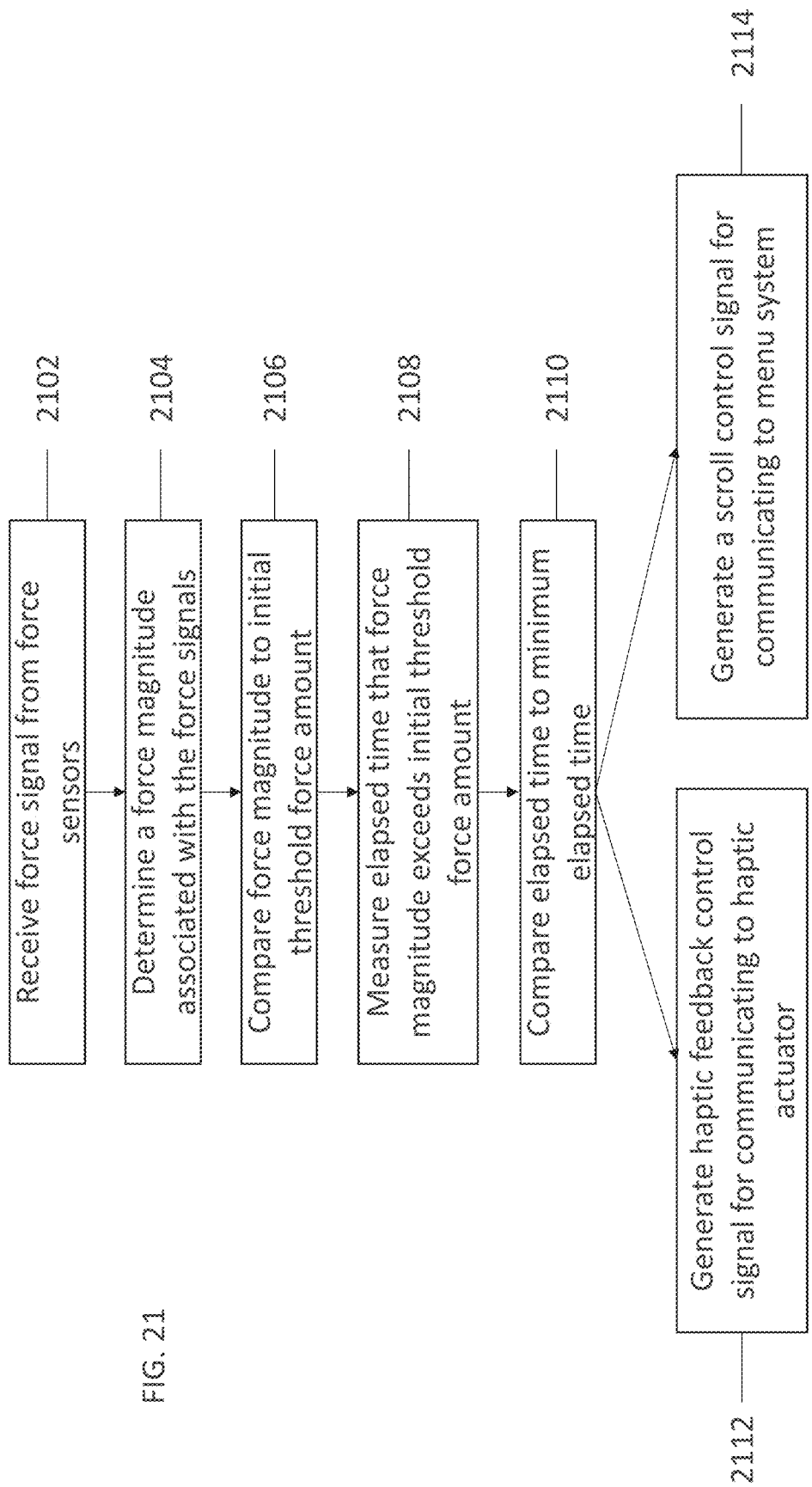

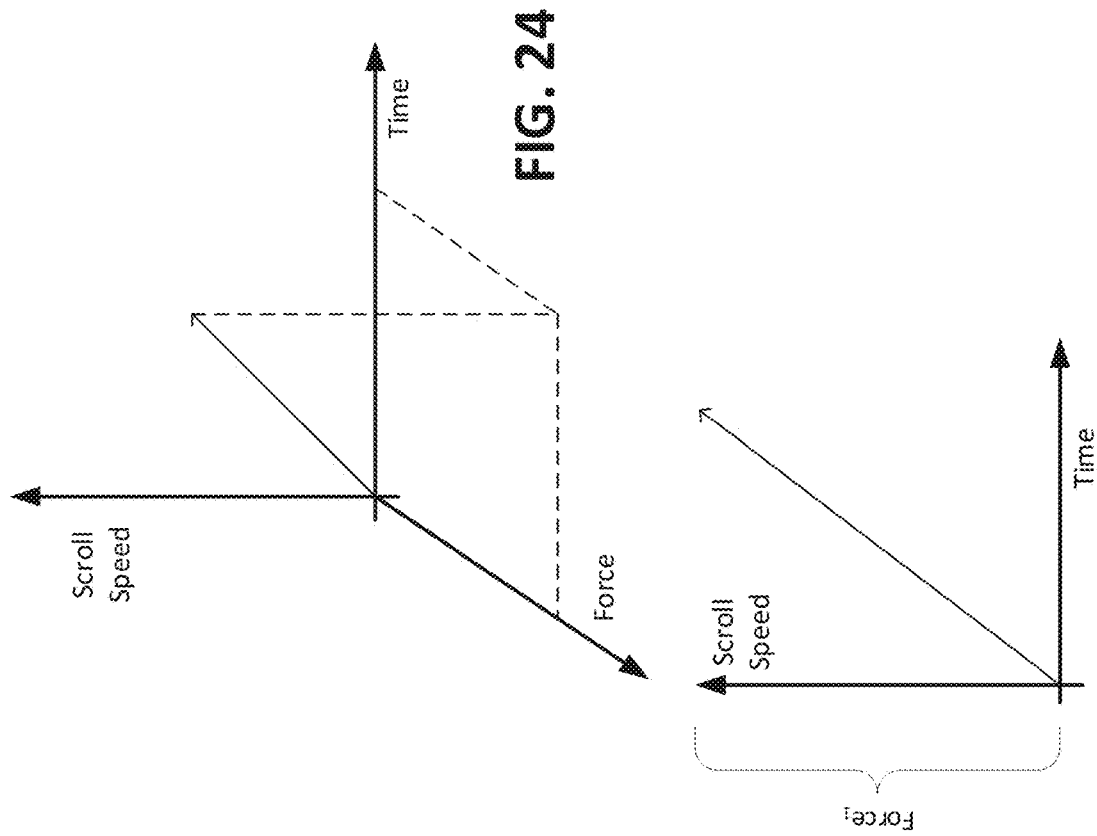
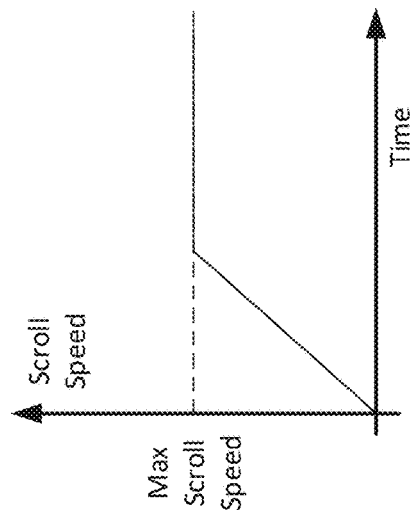

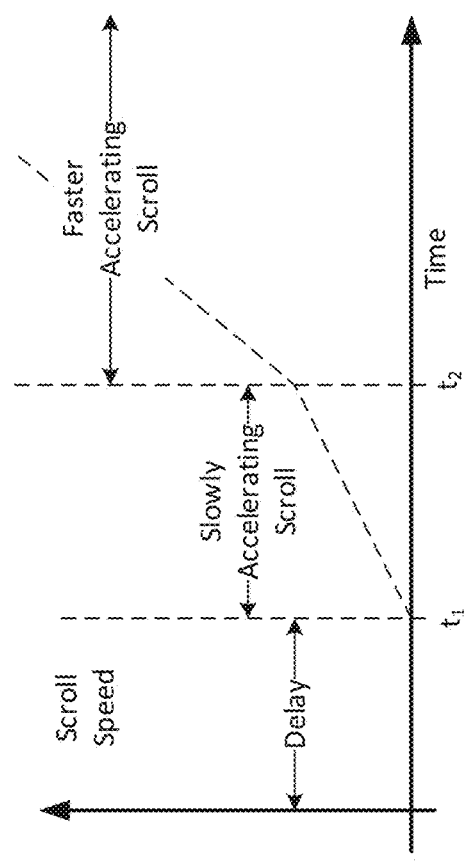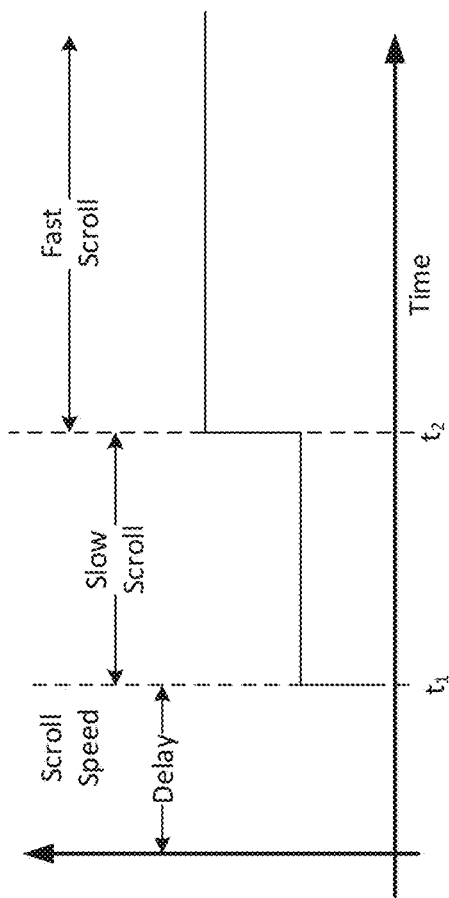

SWITCH ASSEMBLY WITH FORCE-ASSOCIATED VARIABLE SCROLL SPEED AND METHODS OF USE

CROSS REFERENCE TO RELATED APPLICATION

This application is a continuation of U.S. patent application Ser. No. 18/057,074 filed on Nov. 18, 2022, which is a continuation of U.S. patent application Ser. No. 15/862,428 (now U.S. Pat. No. 11,507,214) filed on Jan. 4, 2018, which claims priority to and benefit of U.S. Provisional Patent Application No. 62/442,311 filed Jan. 4, 2017. All of which are fully incorporated by reference.

BACKGROUND

Conventional capacitive sense touchscreen technologies, such as those used in smartphones and tablet devices, require significant visual engagement by a driver, which is a distraction for the driver and compromises safety. Conventional mechanical switches and knobs are less distracting because they can be safely used without requiring the driver to remove his eyes from the road, but they tend to have limited flexibility, with each switch controlling a single function or feature.

Thus, there is a need in the art for a switch assembly that provides sufficient feedback to the driver upon receiving driver input to avoid distracting the driver and that provides the ability to control multiple functions and/or vehicle systems with a minimal footprint.

BRIEF DESCRIPTION OF THE DRAWINGS

These and other features, aspects, and advantages of the present invention will become apparent from the following description and the accompanying exemplary implementations shown in the drawings, which are briefly described below.

FIG. 3 illustrates a cross sectional view of a partially assembled switch assembly as taken through the C-C line in FIG. 1.

FIG. 4 illustrates a perspective view of the haptic exciter shown in FIG. 2.

FIG. 9C illustrates a cross sectional view of the light guide shown in FIG. 2.

FIGS. 18A-18D illustrate exemplary touch events and a corresponding haptic response to each touch event, according to one implementation.

FIG. 21 illustrates a flow chart of processing a request to scroll through a menu system according to one implementation.

FIG. 24 is a graph illustrating the general concept that the scroll speed can be directly proportional to the force applied to the touch overlay plate and the time that the force is applied.

FIGS. 25A-25F are graphs that illustrate non-limiting examples of the way that the scroll rate can vary according to the time that the force is applied to the touch overlay plate and/or the force applied to the touch overlay plate.

DETAILED DESCRIPTION

Figure 1:
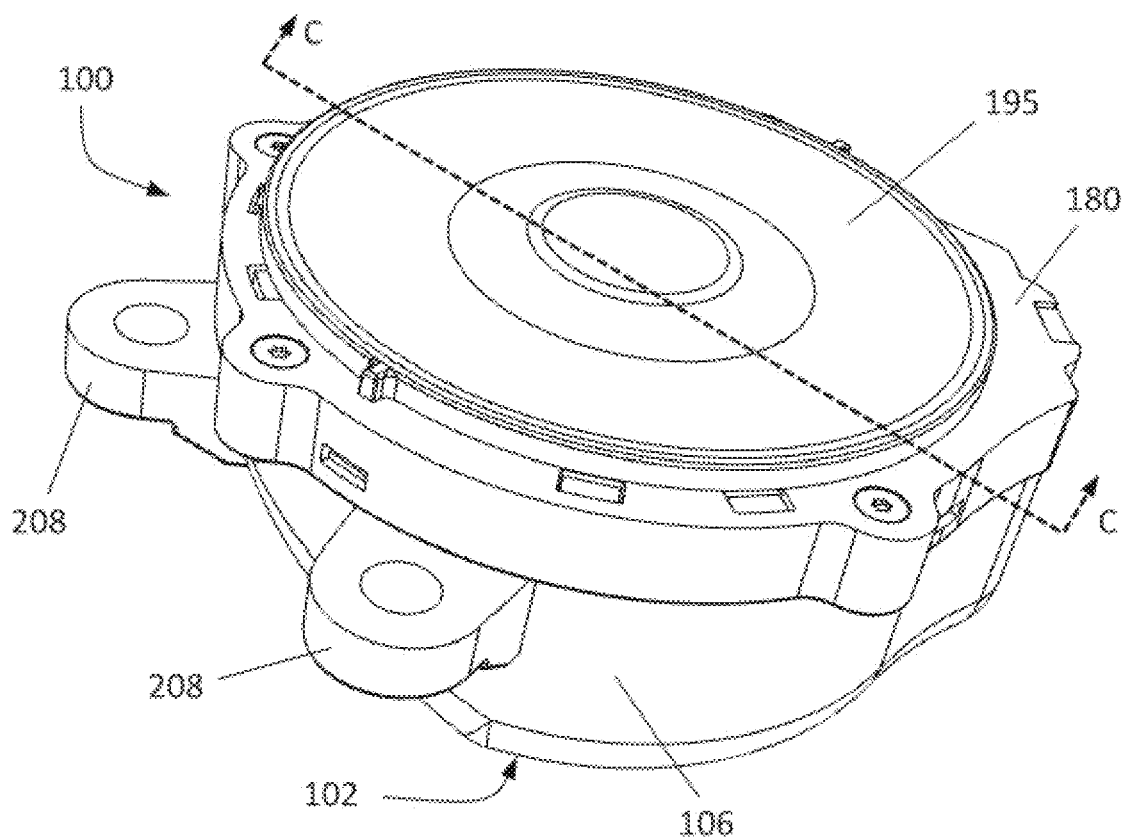
FIG. 1 illustrates a perspective view of a switch assembly according to one implementation.
Figure 2:
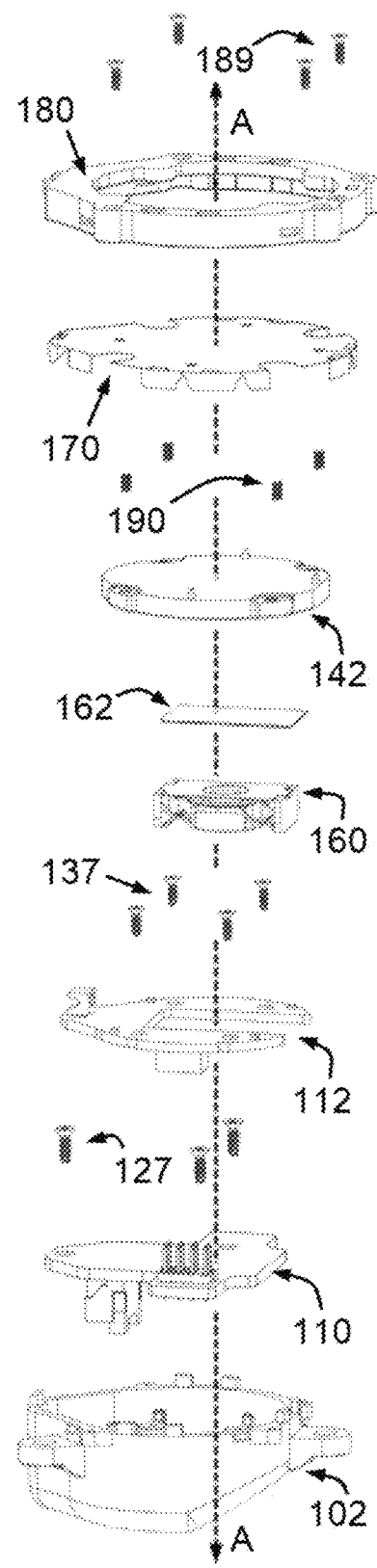
FIG. 2 illustrates an exploded view of part of the switch assembly shown in FIG. 1.

Various implementations include a switch assembly that includes a housing and at least two printed circuit boards (PCBs) that are disposed within the housing and are axially arranged relative to each other. One or more force sensors are disposed on one of the PCBs, and, in some implementations, the one or more force sensors receive force input received by a touch overlay plate. Signals from the force sensors are processed to determine a magnitude, acceleration, and/or location of the force input, and a haptic feedback response is received by the touch overlay plate. The haptic feedback response is based on the force magnitude, acceleration, and/or location of input, according to some implementations. Axially arranging the PCBs reduces the footprint of the switch assembly and allows for the inclusion of more electrical components in the switch assembly, according to some implementations.

Various implementations are described in detail below in accordance with the figures.

For example, FIGS. 1-12 illustrate a switch assembly according to one implementation. The switch assembly 100 includes a housing 102, a first printed circuit board (PCB) 110, a second PCB 112, a light guide 142, a membrane 170, a touch overlay plate 195, and an annular frame 180.

The housing 102 has a first wall 104 and a second wall 106 that define a chamber 108. The second wall 106 extends axially from a radial outer edge 105 of the first wall 104, forming a side wall. A distal edge 172 of the second wall 106 defines an opening to the chamber 108. Longitudinal axis A-A extends through a center of the chamber 108 and the first wall 104.

Two or more PCBs are arranged axially adjacent each other within the chamber 108. In particular, a first PCB 110 is disposed within the chamber 108 adjacent the first wall 104, and a second PCB 112 is axially adjacent and spaced apart from the first PCB 110 within the chamber 108. A first electrical connector 114 extends from a second surface 116 of the first PCB 110, and a second electrical connector 117 extends from a first surface 118 of the second PCB 112. These electrical connectors 114, 117 are axially aligned and coupled together to allow electrical communication between the PCBs 110, 112. The first PCB 110 also includes a third electrical connector 120 extending from a first surface 122 of the first PCB 110. The third electrical connector 120 is electrically coupled with a vehicle communication bus, for example. In the implementation shown, the third electrical connector 120 is axially arranged relative to the first electrical connector 114, but the connectors 120, 114 are not axially aligned. However, in other implementations, the third electrical connector 120 is axially aligned with the first electrical connector 114.

The first wall 104 of the housing includes a first set of one or more projections 125 that extend inwardly into the chamber 108 in the direction of axis A-A. The first surface 122 of the first PCB 110 is disposed on a distal surface 125a of the first set of one or more projections 125 such that the first surface 122 is spaced apart from the first wall 104. The first PCB 110 defines openings 124, and the first set of projections 125 define openings 126 that are axially aligned with openings 124. A fastener 127 is engaged through respective pairs of aligned openings 124, 126 to couple the first PCB 110 to the projections 125 and prevent relative movement of the first PCB 110 within the chamber 108. Although three fasteners are shown, more or less fasteners may be selected. In other implementations, other fastening arrangements may be selected. For example, other fastening arrangements include a friction fit within the housing, snaps, clips, rivets, adhesive, or other suitable fastening mechanism.

Figure 5:
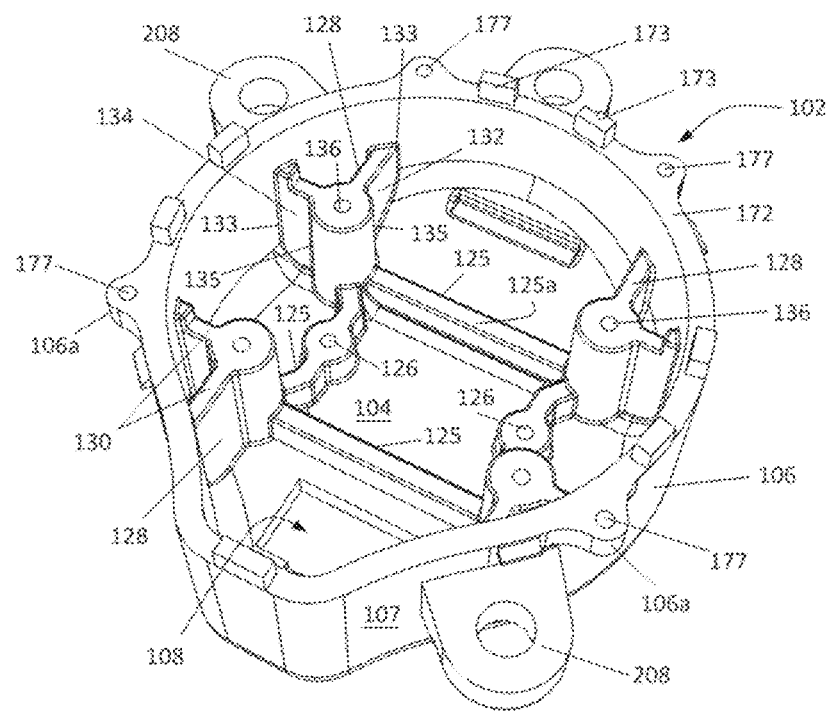
FIG. 5 illustrates a perspective view of the housing shown in FIG. 2.
Figure 6:
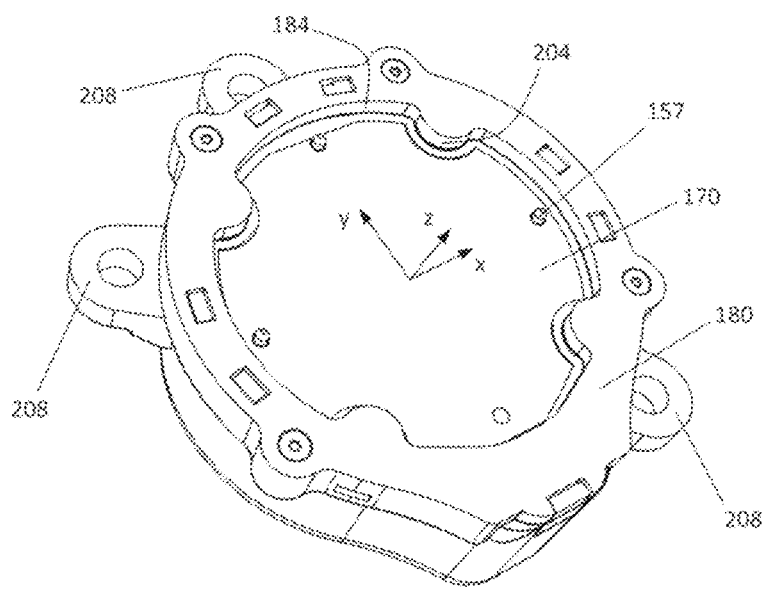
FIG. 6 illustrates a perspective view of the switch assembly shown in FIG. 2 partially assembled.
Figure 7:
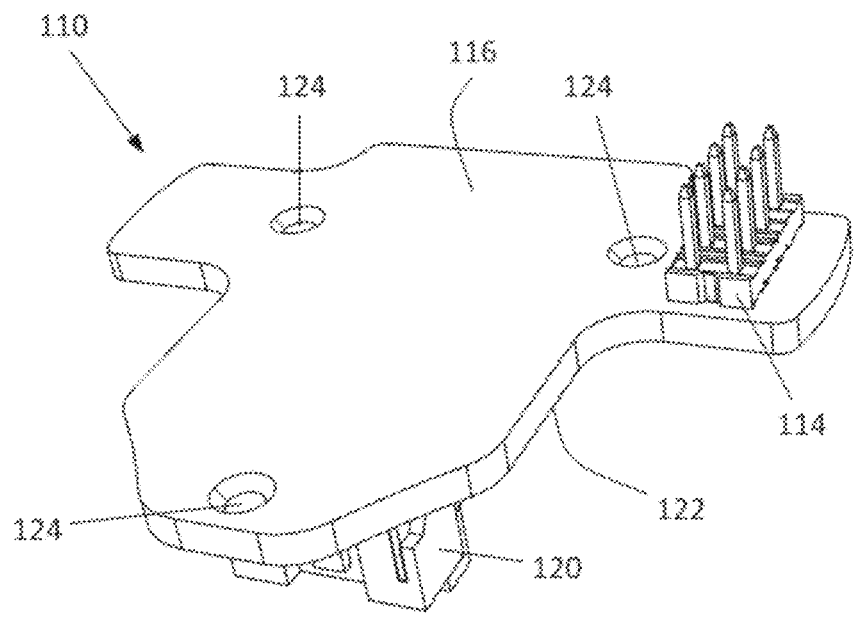
FIG. 7 illustrates a perspective view of the second surface of the first PCB shown in FIG. 2.
Figure 8:
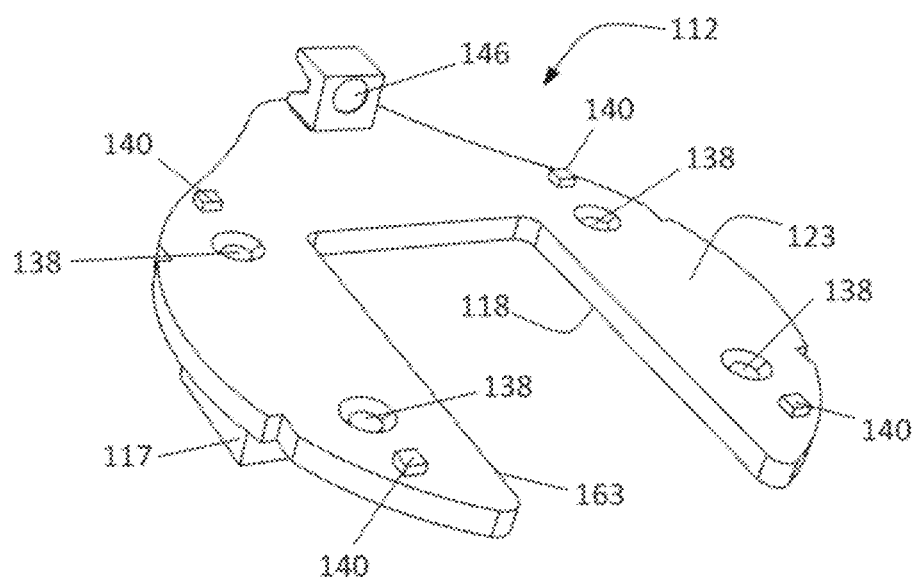
FIG. 8 illustrates a perspective view of the second surface of the second PCB shown in FIG. 2.

A second set of projections 128 extend axially inwardly into the chamber 108 from the first wall 104 and radially inwardly into the chamber 108 (e.g., in a direction perpendicular to and toward the axis A-A) from the second wall 106. The second set of projections 128 are spaced apart from each other. As shown in FIG. 5, each projection 128 includes a first rib 132 and a second rib 134. Each rib 132, 134 includes a proximal edge 133 that is coupled to the second wall 106 and a distal edge 135 that is spaced radially inwardly into the chamber 108 from the proximal edge 133. The distal edges 135 of ribs 132, 134 intersect and define a boss 136. Projections 125 extend between projections 128, but the surface 125a of each projection 125 is spaced apart from a surface 130 of each projection 128. In particular, a plane that includes surface 125a is spaced axially between the first wall 104 and a plane that includes surface 130. The first surface 118 of the second PCB 112 is disposed on the surfaces 130 of projections 128 such that openings 138 defined in the second PCB 112 are axially aligned with openings defined by the bosses 136. Fasteners 137 extend through each pair of aligned openings 138, 136 to couple the second PCB 112 to the projections 128 and prevent relative movement of the second PCB 112 within the chamber 108. Although four fasteners are shown, more or less fasteners may be selected. In other implementations, other fastening arrangements may be selected. For example, other fastening arrangements include a friction fit within the housing, snaps, clips, rivets, adhesive, or other suitable fastening mechanism.

The first PCB 110 has an outer perimeter that is shaped to fit within the chamber 108 and between the second set of projections 128, which allows the first surface 122 of the first PCB 110 to be disposed on the surface 125a of projections 125. The second PCB 112 also has an outer perimeter that is shaped to fit within the chamber 108 such that the first surface 118 of the second PCB 112 engages the ribs 132, 134 of the second set of projections 128.

A plurality of force sensors 140 are disposed on the second surface 123 of the second PCB 112 and are spaced apart from each other. The force sensors 140 are axially aligned with respective first ribs 132 and/or second ribs 134. This arrangement allows force to be applied in the z-direction (i.e., along central longitudinal axis A-A) toward the force sensors 140, and the surfaces 130 of the projections 128 prevent the second PCB 112 from bending or flexing where the force sensors 140 are coupled to the second PCB 112 in response to the force applied, which prevents the force sensors 140 from being damaged. The surfaces 130 of the projections 128 also prevent axial movement of the second PCB 112 relative to the first PCB 110 and the housing 102 when force is received by the force sensors 140. In one implementation, the force sensors 140 comprise micro electro-mechanical sensors (MEMS) that provide an output signal that corresponds with an amount of force received by the sensors. For example, the MEMS force sensors are able to detect force with as little as 2 microns of displacement.

The light guide 142 is disposed within the chamber 108 and includes a first surface 144, a second surface 143 that is opposite and spaced apart from the first surface 144, and a side edge 145 that extends between the first surface 144 and the second surface 143. The first surface 144 of the light guide 142 faces the force sensors 140 coupled to the second PCB 112. The light guide 142 is a plate made from a transparent or translucent material. For example, the light guide 142 may comprise acrylic or a polycarbonate material. At least one light source is disposed on the second surface 123 of the second PCB 112. For example, in some implementations, the light source includes a light emitting diode (LED) 146, and the side edge 145 of the light guide 142 is disposed radially adjacent the LED 146. Light from the LED 146 travels through the side edge 145 of the light guide 142 and exits from the second surface 143 of the light guide 142. With this system, a single light source or multiple light sources are disposed on the same side, adjacent sides, or opposing sides of the light guide 142, and the light is directed toward the second surface 143 of the light guide 142. However, in other implementations, the light may enter the light guide 142 through the first surface 144 of the light guide 142.

In some implementations, the second surface 143, first surface 144, and/or side edge 145 of the light guide 142 include integrally formed micro-lenses to direct light through the light guide 142 and out of the second surface 143. For example, FIG. 9C illustrates a plurality of micro-lenses 147, which include protrusions and/or recessed portions, on the first surface 144 of the light guide 142. In other or further implementations, one or more light altering films are disposed on one or more of the light guide surfaces 143, 144 and/or side edge 145 of the light guide 142.

Figure 9A:
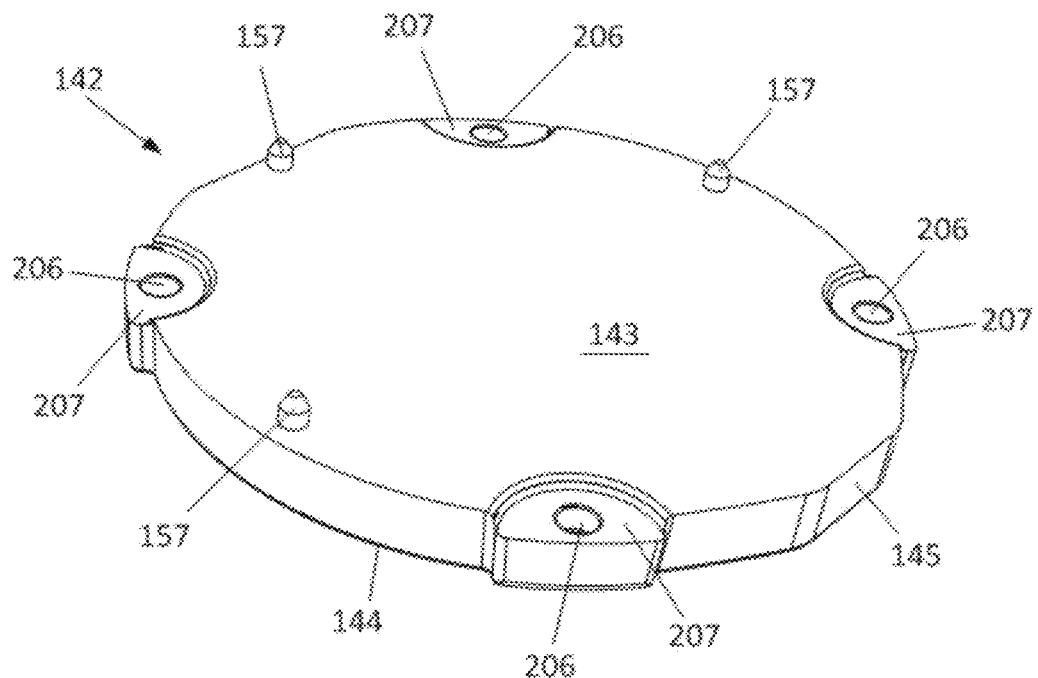
FIG. 9A illustrates a perspective view of the second surface of the light guide shown in FIG. 2.
Figure 9B:
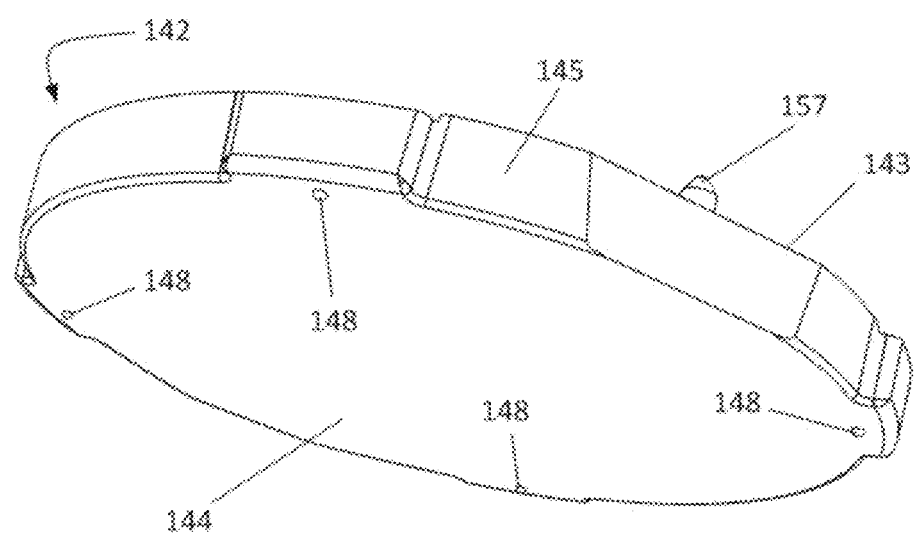
FIG. 9B illustrates a perspective view of the first surface of the light guide shown in FIG. 2.
Figure 10A:
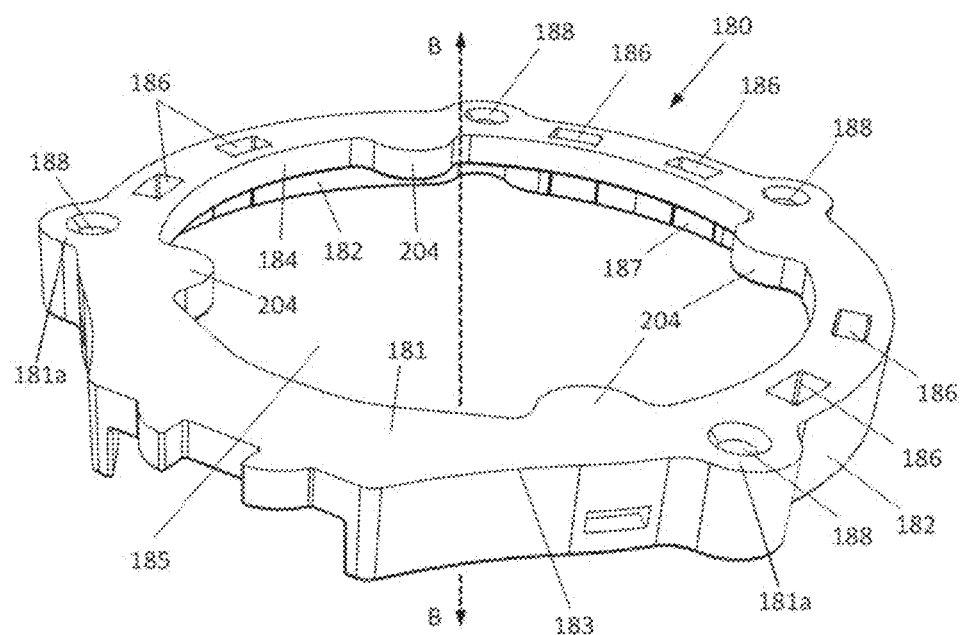
FIGS. 10A and 10B illustrate perspective views of the annular frame shown in FIG. 2.
Figure 10B:
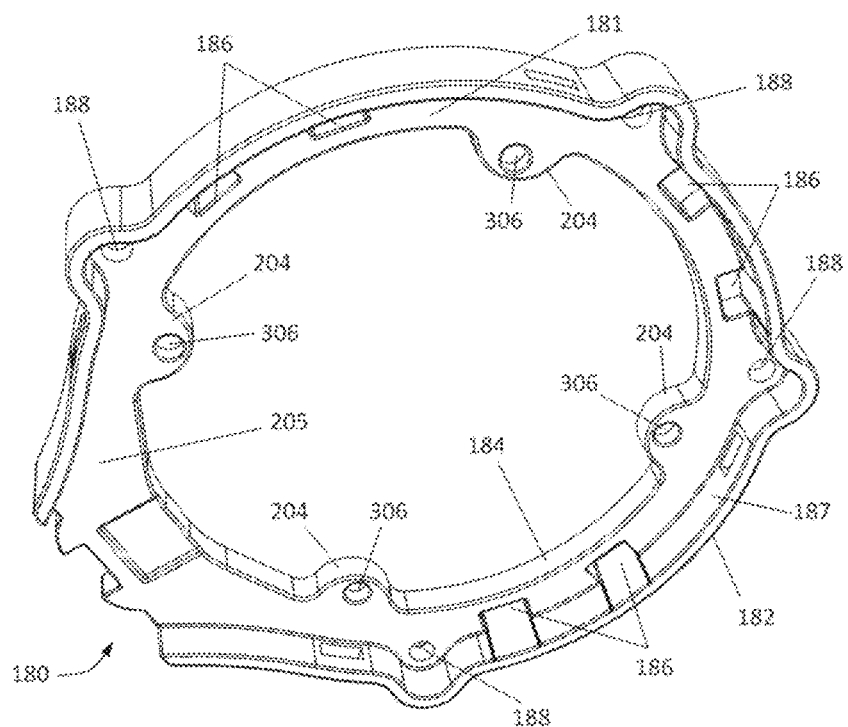
Figure 11:
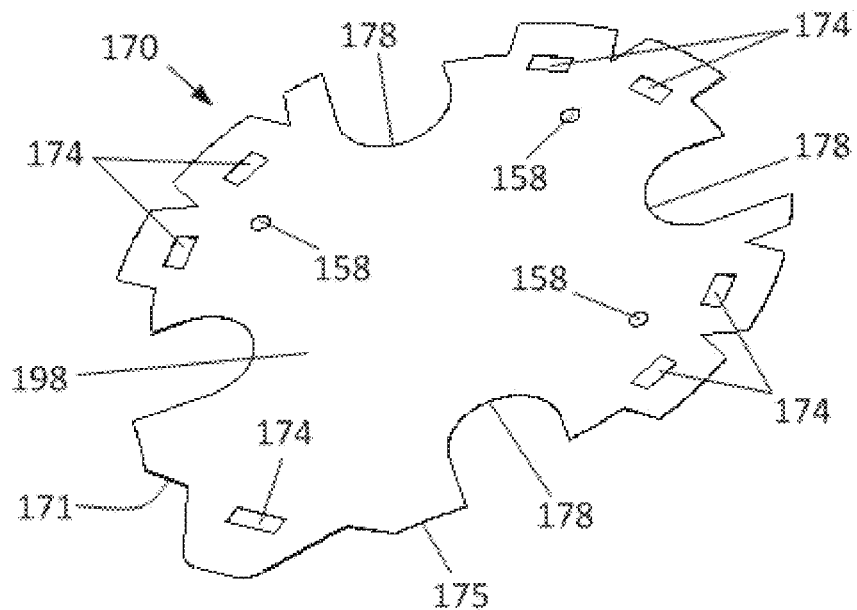
FIG. 11 illustrates a perspective view of the membrane shown in FIG. 2.

In the implementation shown in FIG. 9B, the first surface 144 of the light guide 142 includes a plurality of protrusions 148 that extend axially from the first surface 144. The protrusions 148 axially align with the force sensors 140 on the second PCB 112. The protrusions 148 concentrate the force received by the light guide 142 onto the force sensors 140. In one implementation, the protrusions 148 are integrally formed with the first surface 144. However, in other implementations, the protrusions 148 may be formed separately and coupled to the first surface 144.

Figure 13:
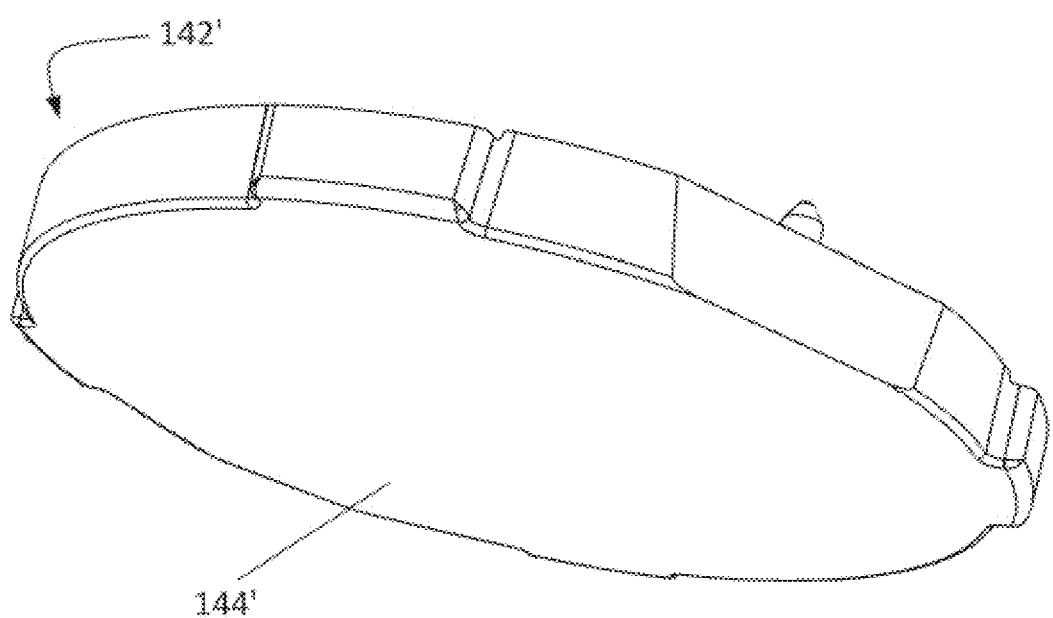
FIG. 13 illustrates perspective view of a first surface of a light guide according to another implementation.

In another implementation shown in FIG. 13, the first surface 144' of the light guide 142' is planar, and a force concentrator that is separately formed from the light guide 142' is disposed between each force sensor and the first surface 144' of the light guide 142'. Each force concentrator transfers force received by the light guide 142' to the respective force sensor below the force concentrator.

The haptic exciter 160 provides haptic feedback to a user. For example, according to one implementation, the haptic exciter 160 is a speaker (e.g., a coneless voice coil assembly), and the haptic output is an audible or inaudible sound wave that changes the air pressure near an output surface of the speaker by propagating a plurality of pressure waves along an axis of propagation. The propagation axis is perpendicular to an output surface 161, and in the implementation shown, is parallel to central axis A-A, which extends orthogonally to and through the surfaces 196, 197 of the touch plate 195. For example, the propagation axis may be co-axial with axis A-A in some implementations. In the implementation shown in FIGS. 1-12, the output surface 161 of the haptic exciter 160 is coupled directly to the first surface 144 of the light guide 142. Thus, at least a portion of the pressure waves propagated from the output surface 161 are directed toward and are captured by the first surface 144 of the light guide 142, which causes vibration, or oscillation, of the light guide 142 in the z-direction. In this implementation, the first surface 144 of the light guide 142 serves as the reaction surface for the exciter 160. The vibration of the light guide 142 is transferred to the membrane 160 and to the touch plate 195. Thus, the haptic exciter 160 is vibrationally coupled to the inner surface 196 of the touch plate 195 because pressure waves originating from the haptic exciter 160 induce a vibratory response on the touch plate 195. In some implementations, the haptic exciter 160 is coupled to the first surface 144 of the light guide 142 using an adhesive 162. However, in other implementations, other suitable fastening mechanisms may be used. And, in other implementations, the output surface 161 of the haptic exciter 160 is disposed axially adjacent and spaced apart from the first surface 144 of the light guide 142. In addition, in some implementations, the haptic exciter 160 is disposed adjacent a central portion of the first surface 144 of the light guide 142.

As shown in FIG. 4, the haptic exciter 160 includes a flexible cable connector 164 that has a first end 165 that is coupled to a first end 166 of the haptic exciter 160 and a second end 167 that is coupled to the first surface 118 of the second PCB 112. The flexible cable connector 164 minimizes or eliminates transmission of the vibration from haptic exciter 160 to the second PCB 112 while allowing the haptic exciter 160 to be electrically coupled to the second PCB 112. In one non-limiting example, the flexible cable connector may be a zero insertion force (ZIF)-type connector. In alternative implementations, the haptic exciter 160 is coupled to the second PCB 112 with wires that are coupled to each via soldering or other suitable coupling mechanism.

In addition, the second PCB 112 defines an opening 163 through which the output surface 161 of the haptic exciter 160 extends for coupling the output surface 161 to the first surface 144 of the light guide 142. This arrangement allows the height in the direction of axis A-A of the switch assembly 100 to be reduced, increases the energy received by the touch overlay 195 from the haptic exciter 160, and reduces the vibrational energy transferred to the second PCB 112. However, in other implementations, the second PCB 112 may not define opening 163, and the haptic exciter 160 may be axially spaced apart from the second surface 123 of the second PCB 112 and disposed between the first surface 144 of the light guide 142 and the second surface 123 of the second PCB 112. By spacing the haptic exciter 160 apart from the second PCB 112, the vibrational energy from the haptic exciter 160 is isolated from the second PCB 112, which allows more of the energy to be received by the light guide 142.

The flexible membrane 170 extends over at least a portion the chamber 108. A first surface 171 of the flexible membrane 170 faces the second surface 143 of the light guide 142, and at least a portion of these surfaces 171, 143 are coupled together (e.g., by adhesion). A plurality of posts 173 extend axially from the distal edge 172 of the second wall 106 of the housing 102 and are circumferentially spaced apart from each other. The flexible membrane 170 defines a plurality of post openings 174 adjacent a radially outer edge 175 of the membrane 170. The posts 173 are engaged through respective post openings 174 of the membrane 170 to prevent movement of the membrane 170 in the x-y plane (i.e., plane perpendicular to the central axis A-A). In some implementations, the surfaces 171, 143 are coupled together prior to the posts 173 being engaged through the openings 174. By limiting the movement of the membrane 170 to the z-direction, the membrane 170 is able to transfer the vibration from the light guide 142 more efficiently, and the membrane 170 can prevent an x- or y-component of force incident on the switch assembly 100 from being transferred to the force sensors 140, which prevents damage to the force sensors 140 due to shear forces. The membrane 170 may also prevent ingress of fluids or debris into the switch 100.

In the implementation described above, the membrane 170 covers the opening of the chamber 108, but in other implementations, the membrane 170 may only cover a portion of the opening of the chamber 108.

The membrane 170 is formed of a flexible material that is capable of resonating in the z-direction. For example, the membrane 170 may be made of a polymeric material (e.g., polyester, polycarbonate), a thin metal sheet, or other suitable flexible material. In addition, the stiffness of the material for the membrane 170 may be selected based on the amount of resonance desired and in consideration of the load to be incident on the membrane 170.

The touch overlay plate 195 has a first surface 196 and a second surface 197. At least a central portion 201 of the first surface 196 of the touch overlay plate 195 is coupled to a second surface 198 of membrane 170, and the second surface 197 of the touch overlay plate 195 faces in an opposite axial direction from the first surface 196 and receives force input from the user. For example, in one implementation, the second surface 198 of the membrane 170 and the central portion 201 of the first surface 196 of the touch overlay plate 195 are adhered together.

In some implementations, at least a portion of the second surface 197 of the touch overlay plate 195 is textured differently than the portion of the vehicle adjacent to the switch assembly 100 to allow the user to identify where the touch overlay plate 195 is in the vehicle without having to look for it. And, in some implementations, as shown in FIG. 3, the second surface 197 includes a non-planar surface. For example, the contour of the non-planar surface may be customized based on various applications of the assembly and/or to facilitate the user locating the second surface 197 without having to look for it.

In some implementations, icons are disposed on the touch overlay plate 195, and light exiting the second surface 143 of the light guide 142 passes through the membrane 170 and the icons on the touch overlay plate 195 to illuminate the icons. For example, by providing icons on a sheet that is adhesively coupled to the touch overlay plate 195, the icons are easily customizable for each vehicle manufacturer, and the switch assembly 100 is manufactured efficiently.

In some implementations, the flexible membrane 170 oscillates in the z-direction in response to receiving vibrational energy from the haptic exciter 160 via the light guide 142, and this oscillation is transferred to the touch overlay plate 195 to provide the haptic feedback to the user. Furthermore, the haptic response of the switch assembly 100 is tunable by selecting a light guide 142, membrane 170, and touch overlay plate 195 that together have a certain stiffness.

In addition, to isolate the vibration of the light guide 142 and touch overlay plate 195 from the housing 102 and PCBs 110, 112 and to ensure that the light guide 142 and touch overlay plate 195 do not rotate about the central axis A-A, an interlocking mechanism is employed to couple the light guide 142 and the touch overlay plate 195, according to some implementations. For example, as shown in FIGS. 3, 6, 9A, 11, and 12, the second surface 143 of the light guide 142 defines a second set of protrusions 157 that extend axially away from the second surface 143. The second set of protrusions 157 includes two or more protrusions, and the protrusions 157 are spaced apart from each other. The protrusions 157 are disposed radially inward of and adjacent the side edge 145 of the light guide 142. The flexible membrane 170 defines openings 158 through which the protrusions 157 extend. And, the first surface 196 of the touch overlay plate 195 defines recessed portions 159 that extend axially into the first surface 196. Distal ends of the protrusions 157 extend and are seated within the recessed portion 159. In the implementation shown in FIGS. 9A and 12, there are four recessed portions 159 defined in the touch overlay plate 195 and three protrusions 157 extending from the second surface 143 of the light guide 142. Having one or more additional recessed portions 159 allows parts to be standardized such that they can be used in different areas of the vehicle (e.g., left side or right side). However, in other implementations, the interlocking mechanism may include one or more protrusions and recessed portions.

In some implementations, a portion or all of the touch overlay plate 195 is comprised of a transparent or translucent material allows light to pass through the touch overlay plate 195. For example, the touch overlay plate 195 may comprise a piece of clear, contoured glass. Other transparent or translucent materials can be used, including other crystal materials or plastics like polycarbonate, for example. The contoured nature of one side, the second side 197, of the touch overlay plate 195 allows the user to move around their finger to find the right button location without having to initiate the switch past the force threshold.

The annular frame 180 includes an annular wall 181 and a side wall 182 that extends axially from adjacent an outer radial edge 183 of the annular wall 181. The annular wall 181 includes an inner radial edge 184 that defines an opening 185 having a central axis B-B. The annular wall 181 also defines one or more post openings 186 between the inner radial edge 184 and the outer radial edge 183. The annular frame 180 is coupled to the second wall 106 of the housing 102. When coupled together, an inner surface 187 of the side wall 182 is disposed adjacent an outer surface 107 of the second wall 106. A portion of the membrane 170 adjacent the outer radial edge 175 of the membrane 170 is disposed between the annular wall 181 and the distal edge 172 of the second wall 106. Posts 173 are engaged through openings 174 defined in the membrane 170 and within respective post openings 186 of annular wall 181 to prevent movement in the x-y plane of the annular frame 180 relative to the housing 102. When coupled, the axis B-B of the annular frame 180 is coaxial with axis A-A of the housing 102. In the implementation shown, at least a portion of the outer radial edge 175 of the membrane 170 folds over the distal edge 172 of the second wall 106 and is disposed between the inner surface 187 of side wall 182 of the annular frame 180 and the outer surface 107 of the second wall 106. Furthermore, protrusions 157 are disposed radially inward of the inner radial edge 184 of the annular wall 181 when the annular frame 180 is coupled to the housing 102.

Fastener openings 188 are defined in the annular wall 181, and fastener openings 177 are defined by the second wall 106 of the housing 102. Fasteners 189 are engaged through aligned pairs of openings 188, 177 to couple the annular frame 180 to the housing 102. For example, in the implementation shown in FIGS. 1-12, the annular wall 181 includes radial extensions 181a that extend radially outwardly from the wall 181 and define the fastener openings 188. And, radial extensions 106a extend radially outwardly from the wall 106 and define fastener openings 177. However, in other implementations, the annular frame 180 is coupled to the housing 102 using other fastening arrangements. For example, in some implementations, the annular frame 180 is coupled to the housing 102 via fasteners extending through the side wall 182 of the annular frame 180 and the outer surface 107 of the second wall 106 of the housing 102. In other implementations, the annular frame 180 is coupled to the housing 102 using a friction fit, snaps, clips, rivets, adhesive, or other suitable fastening mechanism.

In certain implementations, one or more springs are disposed between the annular wall 181 of the annular frame 180 and the light guide 142 to urge the light guide 142 toward the second surface 123 of the second PCB 112. By disposing one or more springs between the annular wall 181, which is fixedly coupled to the housing 102, and the light guide 142, the one or more springs pre-load the force sensors 140. For example, the one or more springs may pre-load the force sensors to between 1 and 5 N. In one non-limiting example, the one or more springs pre-load the force sensors to 2.8 N. For example, in the implementation shown in FIGS. 1-12, the springs include coil springs 190 that extend between a first surface 205 of the annular wall 181 and the second surface 143 of the light guide 142. Axial depressions 206 are defined in a recessed portion 207 defined by the second surface 143 of the light guide 142 and the side edge 145 of the light guide 142. The recessed portions 207 have a surface that is axially spaced apart from the second surface 143 of the light guide 142 in a direction toward the first surface 144 of the light guide 142. Inward radial extensions 204 extend radially inwardly from the inner radial edge 184 of the annular wall 181. The inward radial extensions 204 also define axial depressions 306 according to some implementations. The axial depressions 306 defined by the inward radial extensions 204 are axially aligned with the axial depressions 206 defined by the light guide 142, and ends of each spring 190 seats in the respective axially aligned axial depression 306 of the inward radial extension 204 and the axial depression 206 of the light guide 142 to prevent movement of the coil spring 190 in the x-y plane. In addition, the membrane 170 defines spring recesses 178 that extend radially inwardly from the outer radial edge 175 of the membrane 170, and the springs 190 extend through the recesses 178 and are spaced apart from the outer radial edge 175 of the membrane 170 so as not to interfere with the oscillation of the membrane 170.

Figure 19A:
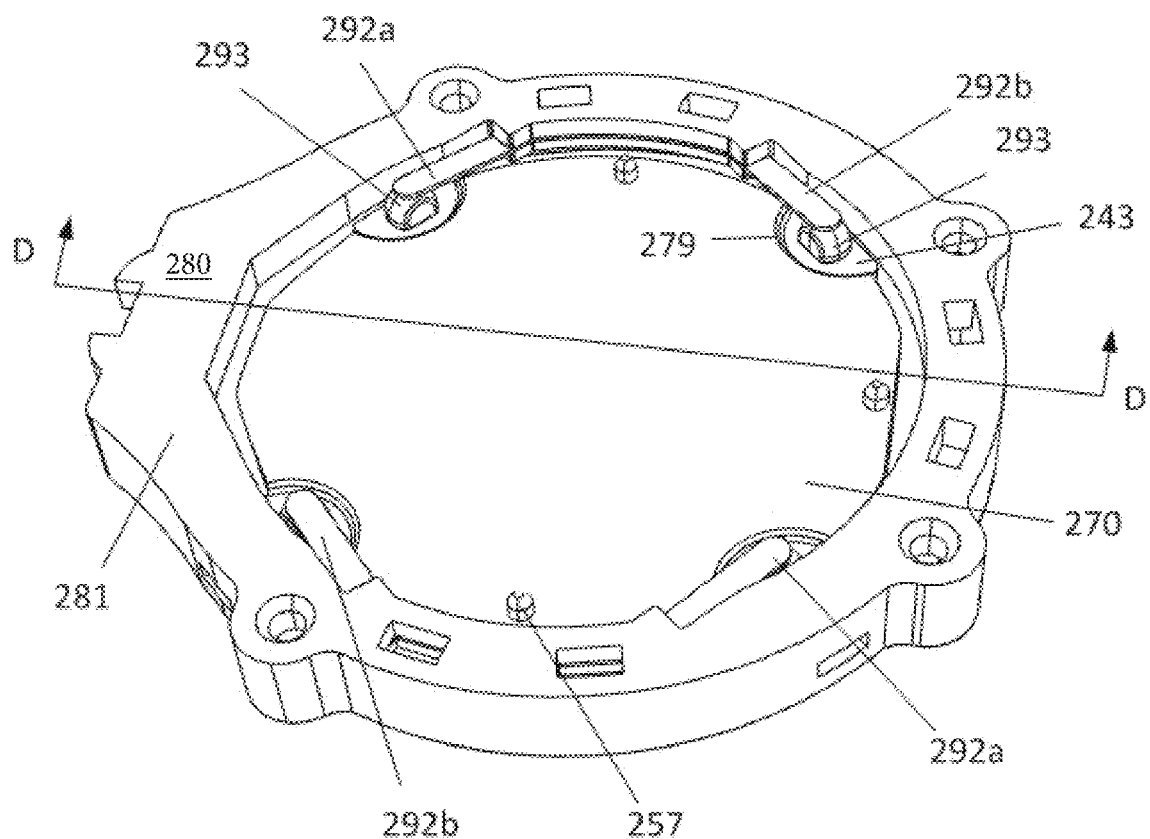
FIG. 19A illustrates a perspective view of a portion of a switch assembly according to another implementation.
Figure 19B:
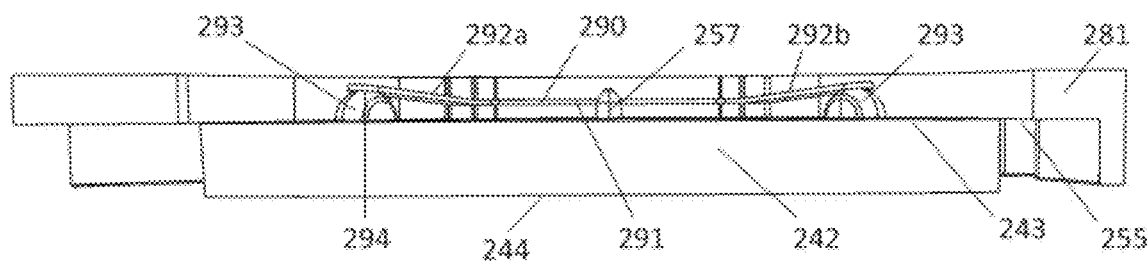
FIG. 19B illustrates a cross sectional view of the portion of the switch assembly shown in FIG. 19A as taken through the D-D line.
Figure 19C:
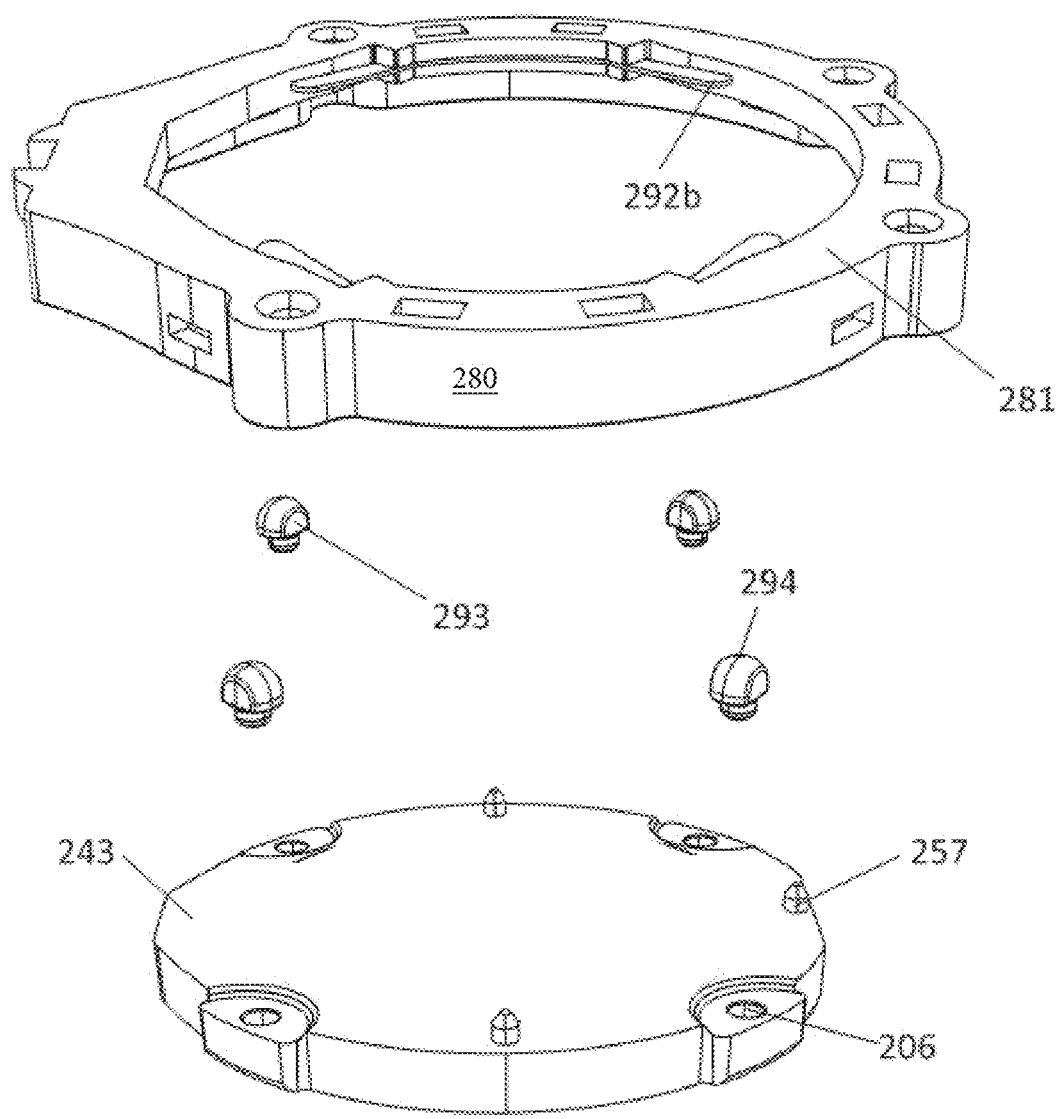
FIG. 19C illustrates an exploded view of the portion of the switch assembly shown in FIG. 19A.
Figure 20A:
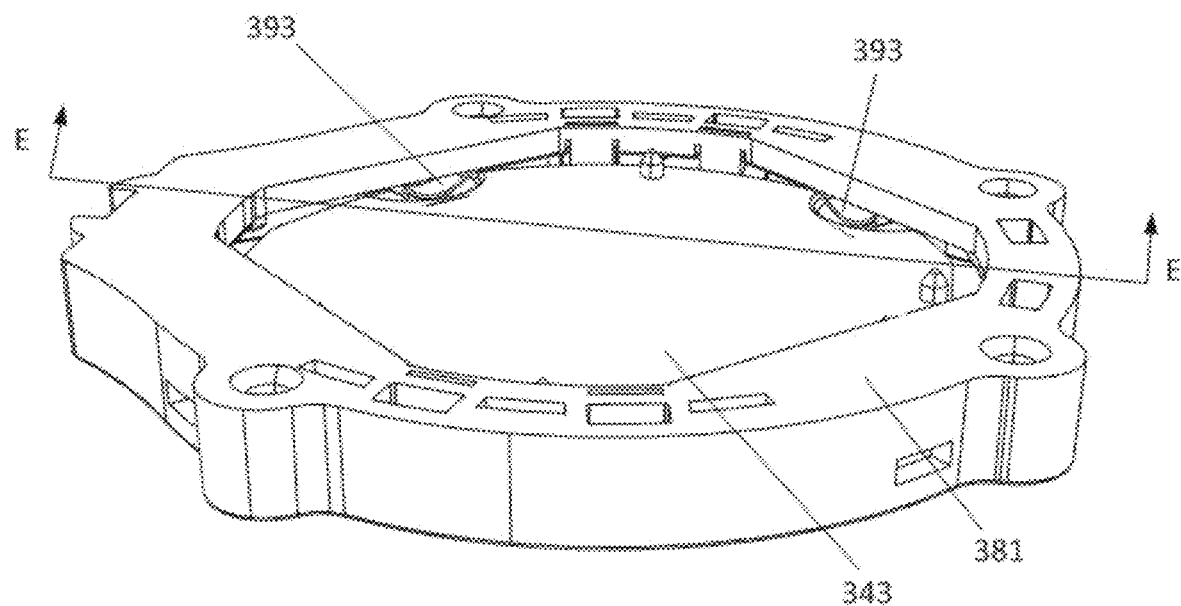
FIG. 20A illustrates a perspective view of a portion of a switch assembly according to another implementation.
Figure 20B:
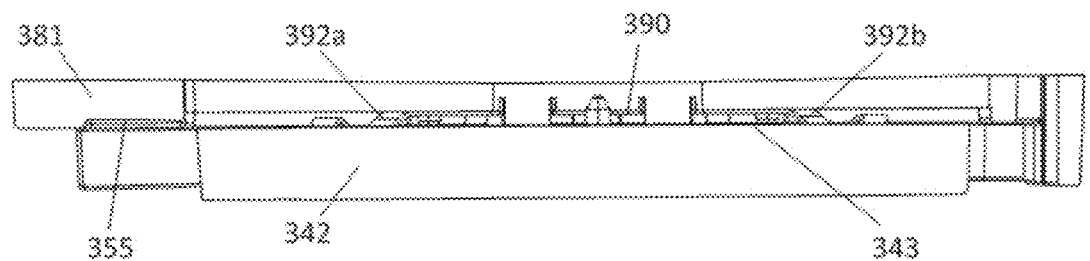
FIG. 20B illustrates a cross sectional view of the portion of the switch assembly shown in FIG. 20A as taken through the E-E line.
Figure 20C:
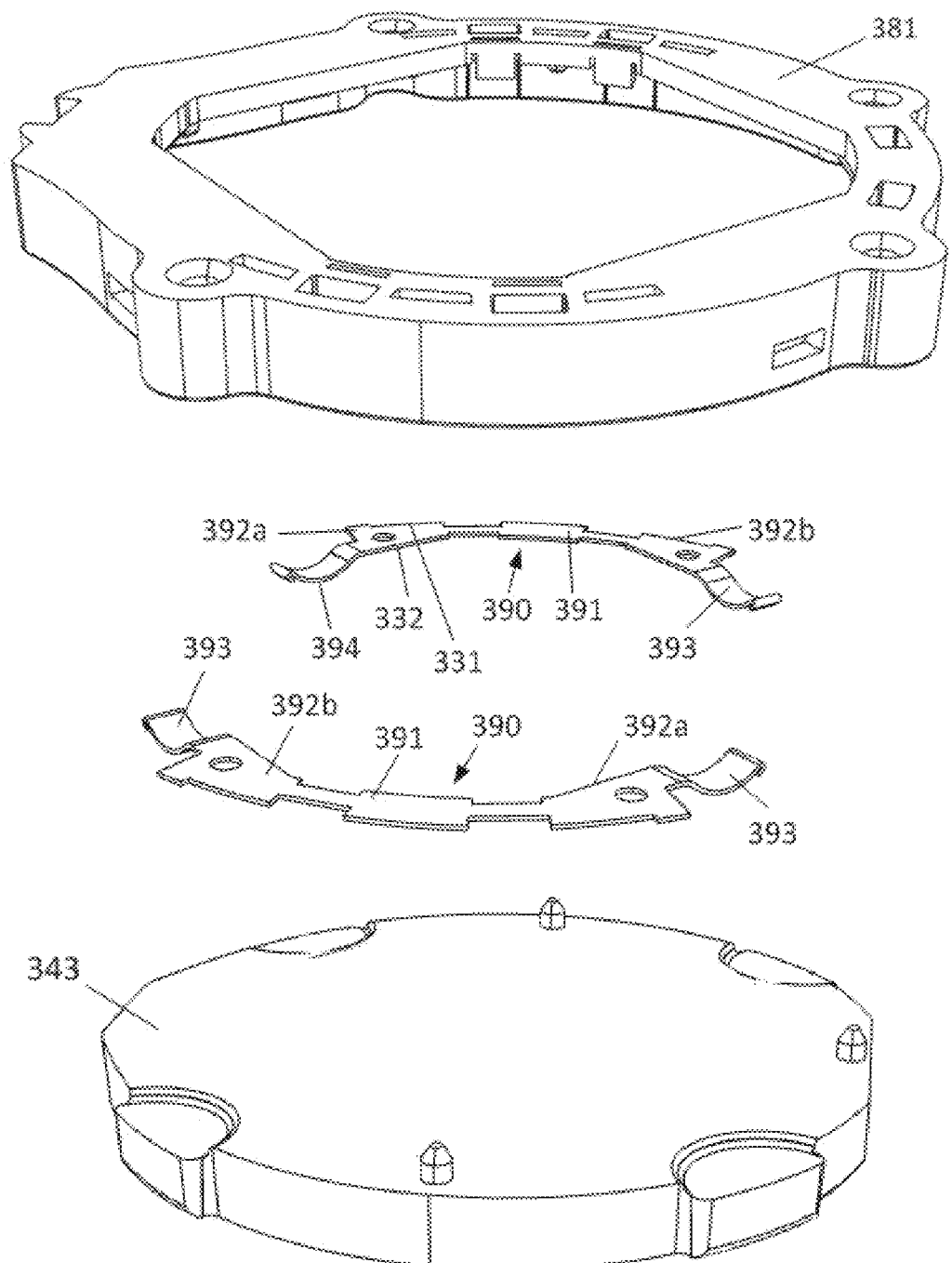
FIG. 20C illustrates an exploded view of the portion of the switch assembly shown in FIG. 20A.
Figure 20D:
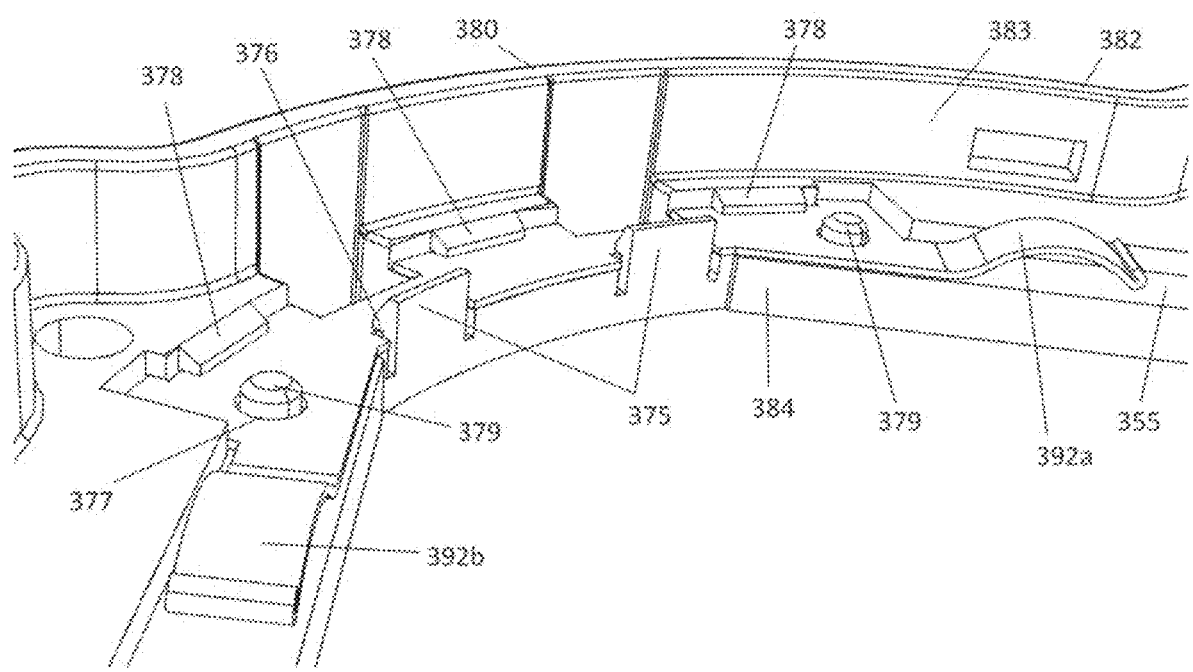
FIG. 20D illustrates a perspective view of a portion of the switch assembly shown in FIG. 20A.

In the implementation shown in FIGS. 19A-19C, the springs are leaf springs 290. The leaf springs 290 include a central portion 291 and leg portions 292a, 292b. Leg portions 292a, 292b extend circumferentially from and radially inwardly from the central portion 291. The second surface 243 of the light guide 242 includes a plurality of posts 293 that extend axially away from the second surface 243, and the membrane 270 defines openings 279 through which the posts 293 extend. The central portion 291 of each leaf spring 290 is coupled to the first surface 255 of the annular wall 281 of the annular frame 280, and the leg portions 292a, 292b engage distal ends 294 of posts 293. When assembled, a plane that includes the first surface 255 of the annular wall 281 to which the central portion 291 of the leaf spring 290 is coupled is axially between a plane that includes the distal ends 294 of the posts 293 and a plane that includes the second surface 243 of the light guide 242. Thus, the leg portions 292a, 292b of the leaf spring 290 are biased toward the light guide 242 and urge the first surface 244 of the light guide 242 toward the second PCB 112. It is to be appreciated that the posts 293 may be separate from the light guide 242, or they can be integrally formed with the light guide 242. FIG. 19B also shows a second set of protrusions 257, which are similar to the second set of protrusions 157 shown in FIGS. 3, 6, 9A, 11, and 12, that extend axially away from the second surface 243 of the light guide 242. The second set of protrusions 257 includes three protrusions, and the protrusions 257 are spaced apart from each other. The protrusions 257 are disposed radially inward of and adjacent the side edge 245 of the light guide 242. Like the protrusions 157 described above, the protrusions 257 extend through openings in the membrane and into recessed portions defined by the first surface of the touch overlay. FIGS. 20A-20D illustrate leaf spring 390 according to another implementation. In this implementation, the leaf spring 390 includes a central portion 391 and leg portions 392a, 392b that extend circumferentially from and radially inwardly from the central portion 391. Each leg portion 392a, 392b also includes an arcuate portion 393 having an apex 394 that is within a plane that is spaced apart from a plane that includes the central portion 391. The central portion 391 is coupled to the first surface 355 of an annular wall 381, and the apex 394 of each arcuate portion 393 abuts the second surface 343 of the light guide 342. The arcuate portion 393 maintains a minimum axial spacing between the second surface 343 of the light guide 342 and the first surface 355 of the annular wall 381.

At least a portion of the leaf spring 390 is coupled to the annular frame 380. The inner radial edge 384 of the annular wall 381 includes one or more resilient tabs 375 that extend axially in a first direction (i.e., in a direction away from and orthogonal to the first surface 355 of the annular wall 381) from the inner radial edge 384. Each resilient tabs 375 has a shoulder 376 that extends radially outwardly from the tab 375 toward the first surface 355 of the annular wall 381. Each shoulder 376 is axially spaced apart from the first surface 355 of the annular wall 381. The side wall 382 of the annular frame 380 also includes one or more tabs 378 that extend radially inwardly from an inner surface 383 of the side wall 382. The one or more tabs 378 are axially spaced apart from the first surface 355 of the annular wall 381. The first surface 355 of the annular wall 381 includes one or more protrusions 379 that extend axially in the first direction from the first surface 355. A radially outer edge 331 of the central portion 391 of the leaf spring 390 is urged axially between tabs 378 and the first surface 355 of the annular wall 381, and a radially inner edge 332 of the central portion 391 is urged against the resilient tabs 375, which causes the resilient tabs 375 to bend radially inwardly as the leaf spring 390 passes by the shoulders 376 and is disposed between the shoulders 376 and the first surface 355 of the annular wall 381. Also, a concave surface of each arcuate portion 393 is positioned to face axially toward the first surface 355 of the annular wall 381 such that the apex 394 faces away from the first surface 355. The leaf spring 390 defines one or more openings 377 that align with the one or more protrusions 379, and the protrusions 379 extend through the openings 377 when the edges 331, 332 are disposed between the tabs 375, 378 and the first surface 355 of the annular wall 381. The tabs 375, 378 hold the leaf spring 390 axially and radially adjacent the annular frame 380, and the protrusions 376 engaged through the openings 377 prevent the leaf spring 390 from circumferential movement relative to the annular frame 380.

In other implementations, the leaf spring 290, 390 is overmolded with a portion of the annular frame 280, 380 over the central portion 291, 391 thereof. And, in some implementations, the spring 290, 390 may be adhered to, snapped to, or otherwise fastened to the annular frame 280, 390.

In addition, according to various implementations, the leaf spring 290, 390 may comprise a spring steel plate.

Figure 12:
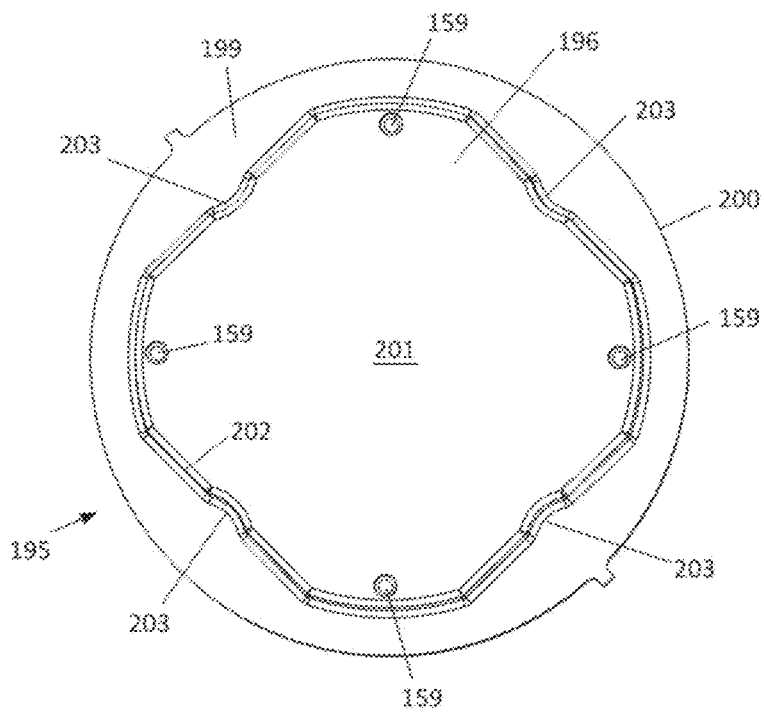
FIG. 12 illustrates a plan view of the first surface of the touch overlay plate shown in FIG. 1.

The central portion 201 of the touch overlay plate 195 is disposed within the opening 185 defined by the inner radial edge 184 of the annular wall 181 and is coupled to the membrane 170, as described above. As shown in FIG. 12, the first surface 196 of the touch overlay plate 195 defines a recessed portion 199 adjacent an outer radial edge 200 of the touch overlay plate 195. The recessed portion 199 and an outer radial edge 202 of the central portion 201 of the first surface 196 further define a plurality of depressions 203 (or grooves) that extend axially from the first surface 196 of the central portion 201 to the annular recessed portion 199 and radially inwardly from the outer radial edge 202. To prevent the touch overlay plate 195 from contacting the annular frame 180, the depressions 203 are spaced radially inwardly of the radial extensions 204 of the annular wall 181 of the annular frame 180. In addition, the distance $T_T$ between the surface of the annular recessed portion 199 and the surface of the central portion 201 is greater than a thickness $T_A$ (as measured in the z- or axial direction) of the annular wall 181. And, a diameter (or width $W_T$) of the second surface 197 of the touch overlay plate 195 is greater than a diameter (or width $W_A$) of the annular wall 181 such that the touch overlay plate 195 hides the annular wall 181 when the assembly 100 is viewed from the second surface 197 of the touch overlay plate 195.

In some implementations, such as those described above, the distal edge 172 of the second wall 106 of the housing 102, the annular frame 180, the light guide 142, and the outer radial edge 200 of the touch overlay plate 195 are generally circular. However, in other implementations, these portions of the switch assembly may have a non-circular shape, such as triangular, rectangular, or other suitable polygonal shape.

In other implementation, the switch assembly includes just one PCB on which the force sensors are disposed. In such implementations, the circuitry required to operate the switch fits on the one PCB.

In addition, in other implementations, the switch assembly may include just one PCB and one force sensor for applications that require output from one force sensor (output that is not position specific).

In some implementations, the switch assemblies described above are mountable within a vehicle. For example, the switch assemblies are mountable to a steering wheel, such as to the bevel or hub of the steering wheel, for use in controlling various vehicle systems. In other examples, the switch assemblies are mountable to a vehicle door, gear shifter, dashboard, or any portion of the vehicle where input can be provided and used to control one or more vehicle systems.

For example, in some implementations, such as those described above, the housing is coupled to a trim piece in the vehicle instead of a frame or support portion of the vehicle, which isolates the vibration from the haptic exciter from other portions of the vehicle. This arrangement also allows the gap between edges of the trim piece and the outer edge of the assembly to be minimized because the trim piece can move with the assembly. To couple the housing to the trim piece (or other portion of the vehicle), bosses 208 that extend radially outwardly from the outer surface of second wall are aligned with openings defined adjacent the portion of the vehicle to which the switch assembly is being coupled. A fastener is engaged through the aligned openings to secure the assembly to the vehicle.

Figure 14:
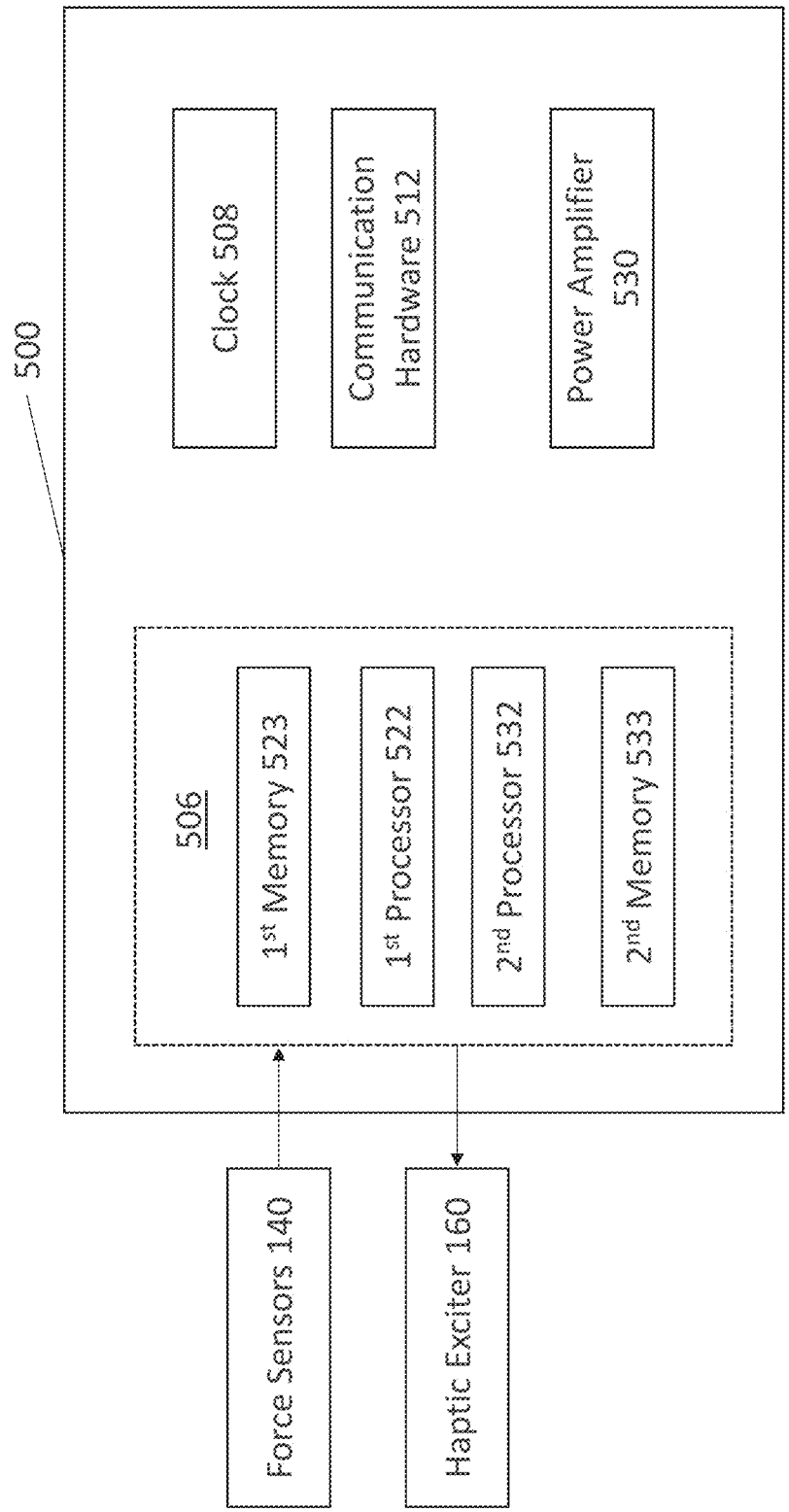
FIG. 14 illustrates a block diagram of an electrical control system according to one implementation.

FIG. 14 illustrates a block diagram of the electrical control system 500, according to one implementation. The electrical control system 500 may include a computing unit 506, a system clock 508, and communication hardware 512. In its most basic form, the computing unit 506 includes a processor 522 and a system memory 523 disposed on the second PCB 112. The processor 522 may be standard programmable processors that perform arithmetic and logic operations necessary for operation of the electrical control system 500. The processor 522 may be configured to execute program code encoded in tangible, computer-readable media. For example, the processor 522 may execute program code stored in the system memory 523, which may be volatile or non-volatile memory. The memory 523, which can be embodied within non-transitory computer readable media, stores instructions for execution by the processor 522. The system memory 523 is only one example of tangible, computer-readable media. In one aspect, the computing unit 506 can be considered an integrated device such as firmware. Other examples of tangible, computer-readable media include floppy disks, CD-ROMs, DVDs, hard drives, flash memory, or any other machine-readable storage media, wherein when the program code is loaded into and executed by a machine, such as the processors 522, 532, the machine becomes an apparatus for practicing the disclosed subject matter.

In addition, the processor 522 is in electrical communication with the force sensors 140. In some implementations, the system 500 further includes a transceiver that is in electrical communication with the processor 522 and one or more vehicle systems. And, in some implementations, the system 500 further includes a power amplifier 530 that is in electrical communication with the processor 522 and the haptic exciter 160.

However, in other implementations, the system 500 includes two or more processors and/or memories, and the processors and/or memories may be disposed on the first and/or second PCBs. And, in other implementations, the assembly includes one or more PCBs on which one or more force sensors, one or more memories, and one or more processors are disposed.

Aspects of the present invention are described above with reference to flowchart illustrations and/or block diagrams of methods, apparatus (systems) and computer program products according to implementations of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 15:
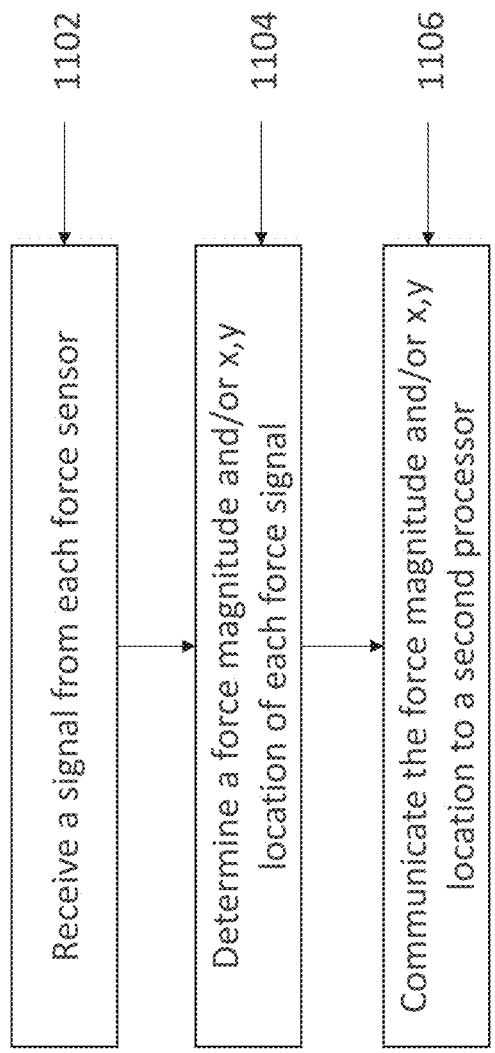
FIG. 15 illustrates a flow diagram of instructions stored on a memory for execution by a processor disposed on the second PCB, according to one implementation.

FIG. 15 illustrates a flow diagram of instructions stored in the first memory 523 for execution by the first processor 522 according to one implementation. The instructions cause the first processor 522 to: (1) receive a signal from each of the one or more force sensors 140, the signal being associated with a force received by each of the force sensors 140, as shown in step 1102, (2) determine a force magnitude and/or x,y location associated with the received force signals, as shown in step 1104, and (3) communicate the force magnitude and/or x,y location to the second processor 532 disposed on the first PCB 110, as shown in step 1106. Having the force sensors 140 in close proximity to the first processor 522 that initially processes the signals from the force sensors 140 reduces the likelihood of noise in the signals.

Figure 16:
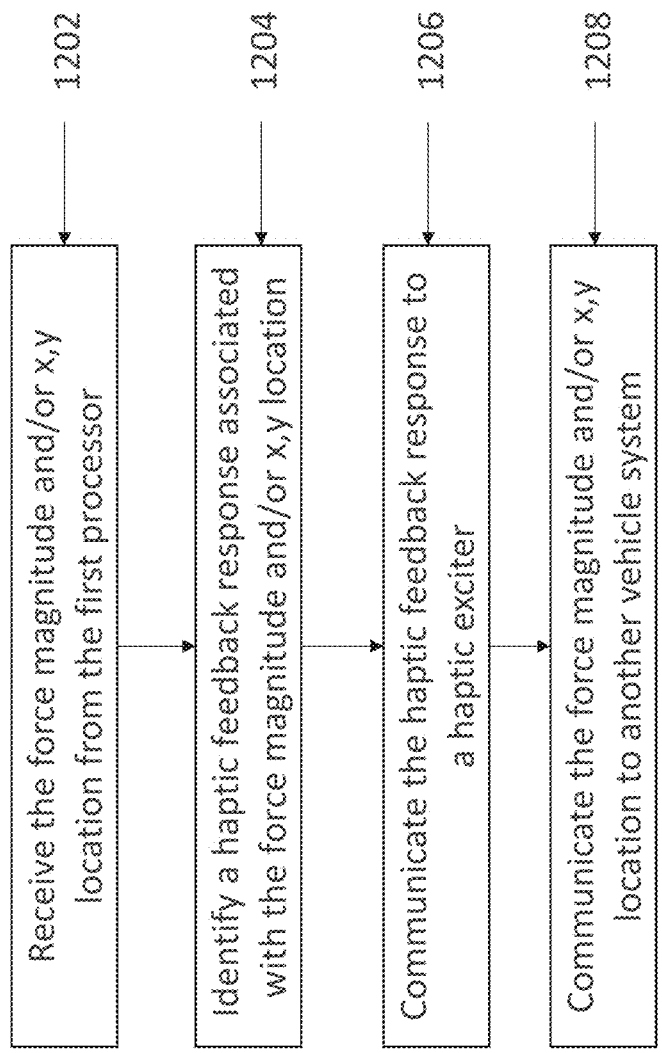
FIG. 16 illustrates a flow diagram of instructions stored on a memory for execution by a processor disposed on the first PCB, according to one implementation.

FIG. 16 illustrates a flow diagram of instructions stored in the second memory 533 for execution by the second processor 532. The instructions stored in the second memory 533 cause the second processor 532 to: (1) receive the force magnitude and/or x,y location from the first processor 522, as shown in step 1202, (2) identify a haptic feedback response associated with the force magnitude and/or x,y location, as shown in step 1204, (3) communicate the haptic feedback response to a haptic exciter 160, as shown in step 1206, and (4) communicate the x,y location and/or the force magnitude to another vehicle system, as shown in step 1208. The switch assembly 100 according to one implementation may be configured for controlling up to 32 functions.

Figure 17:
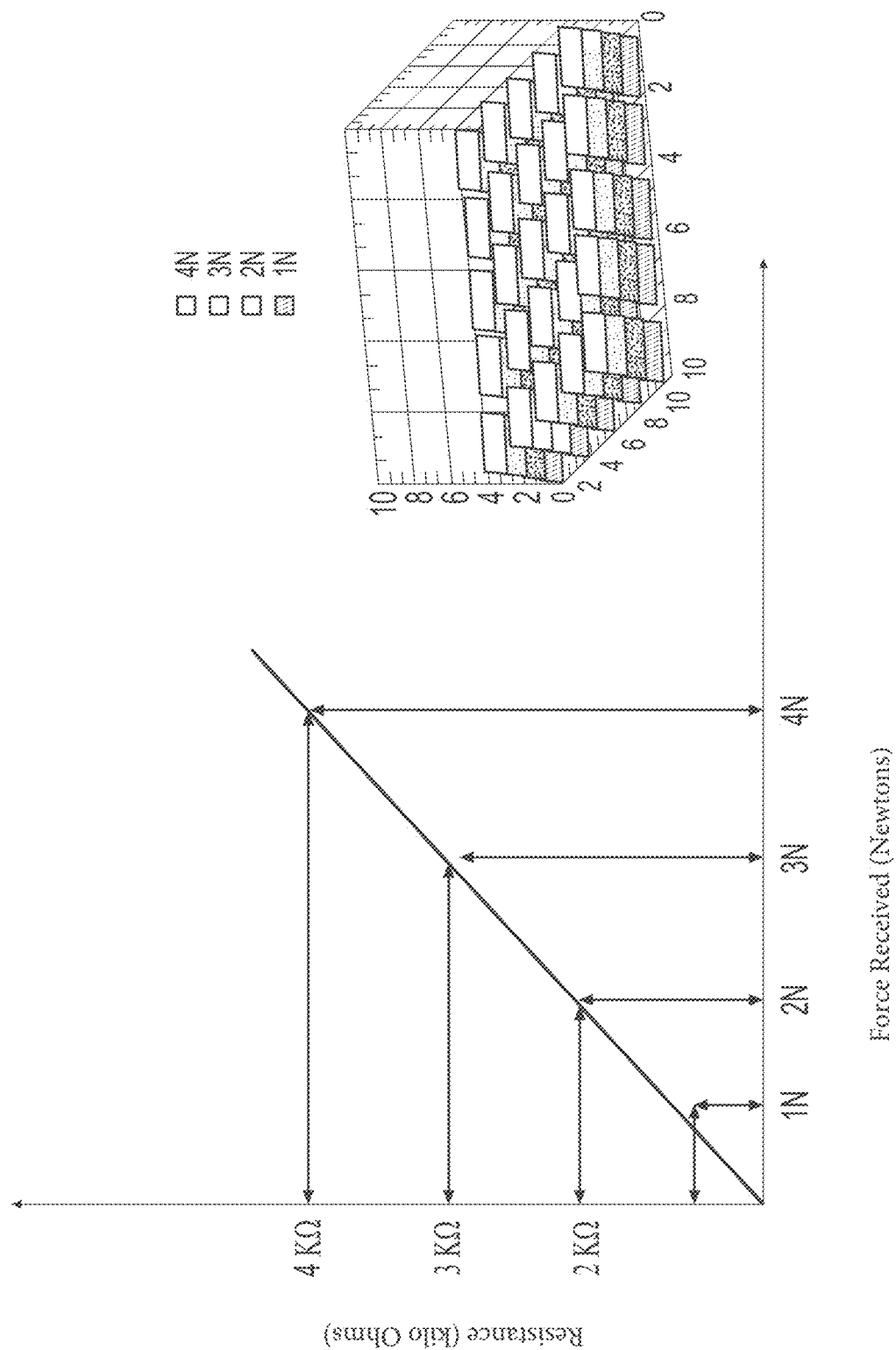
FIG. 17 illustrates a graph of a resistance sensed by the force sensors and a corresponding force signal associated with each resistance level, according to one implementation.

The force sensors 140 each receive a portion of the force applied to the touch overlay 195, and the force received by each sensor 140 is processed by the first processor 522 to determine a position and magnitude of the force applied. The position of the force is determined by the portion of the force received by each force sensor 140 and their known location relative to each other. For example, in the implementation shown in FIG. 17, the force received by each sensor 140 (shown on the x-axis) is associated with a resistance (shown on the y-axis). The position of the applied force is measured in either one dimension (e.g., the x- or y-dimension) or two dimensions (e.g., the x- and y-directions or plane), and the magnitude of the force is measured in the z-direction. In the implementation shown in FIGS. 1-12, which has four force sensors 140, the position of the force is determined by quad-angulation of the force signals received from each sensor 140. In further or alternative implementations, the position of the force is determined by tri-angulation using three force sensors. For example, if one of the four force sensors 140 fails during operation, the location is determined by tri-angulation using the force signal received from the remaining three sensors 140.

The switch assembly 100 also senses the time that a force is applied at a particular location. For example, the memory 523 may store processing parameters, such as a range of force over time values that indicate an input signal has been received. Input received outside of the range may be ignored by the system as unintentional contact with the switch assembly 100. For example, the upper limit of the input range may be 10 N of force applied for 20 seconds or less. Furthermore, the switch assembly 100 may also set a force threshold for locking an input area (e.g., 2.5 N) around a location of force input and a second, higher threshold for a force received within the input area for enabling the system 100 (e.g., 3 N). Additional description of force thresholds and virtual input areas are provided in U.S. Patent Application Publication Nos. 2015/0097791 and 2015/0097795, both published Apr. 9, 2015, which are included in the Appendix to this application.

In response to the magnitude, location, and/or duration of the applied force meeting the input parameters, the switch assembly 100 generates a haptic and/or audible feedback signal responsive to the detected force. For example, the haptic and/or audible feedback signal may be proportional to the force received. As shown in FIGS. 18A-D, each touch event (e.g., touch-down shown in FIG. 18A, lift-off shown in FIG. 18B, end of list shown in FIG. 18C, and hold-down shown in FIG. 18D) is initiated by a different user interaction (e.g., different force value and/or duration of the touch) and, accordingly, can trigger different haptic and/or audible output feedbacks provided to the user. Exemplary haptic and/or audible feedback signal responses are described in U.S. Patent Application Publication Nos. 2015/0097794 and 2015/0097793, both published Apr. 9, 2015, which are included in the Appendix to this application.

The drawings illustrate the switch assembly as viewed in an upright orientation in which the central longitudinal axis A-A is vertically oriented. However, the orientation shown in the drawings should not limit how the switch assembly may be oriented within the vehicle. For example, in various implementations, the switch assembly is disposed in the vehicle such that the central longitudinal axis A-A is horizontal or has a horizontal component relative to the ground.

In certain implementations, the switch assembly 100 allows a user to control scrolling through a list of menu options made available by a menu system. As used herein, "menu system" refers to any system that includes a list of one or more options, and "menu options" refer to the options made available by the menu system. When the menu system has a relatively long list of menu options, the switch assembly 100 provides a force scrolling feature, which allows the user to apply more force to the touch overlay plate 195 to scroll more quickly through the menu options or apply less force to scroll less quickly. The haptic feedback corresponds to the speed of scrolling through the menu options to give the user haptic feedback as menu options are scrolled through. Thus, the speed of scrolling and the frequency at which the pressure waves are output by the haptic actuator 160 are proportional to the amount of force applied.

To activate the force scrolling feature, a force scroll delay is set for the switch assembly 100, according to some implementations. For example, the processor activates force scrolling in response to detecting an initial threshold amount of force on the force sensors 140 for a minimum elapsed time. The initial threshold amount of force and the minimum elapsed time may be set during manufacturing or changed later by the end user or a manufacturer of other equipment that incorporates the switch assembly.

Once activated, the force scrolling feature allows the user to scroll through a plurality of menu options with one push and one lift off to scroll to or near the menu option to be selected, instead of having to apply sequential pushes and lift offs to the touch overlay plate 195 to scroll through each option. Once the user approaches the menu option to be selected, the user can push and lift off more quickly to scroll through the menu options one by one until the menu option to be selected is reached.

Figure 25E:
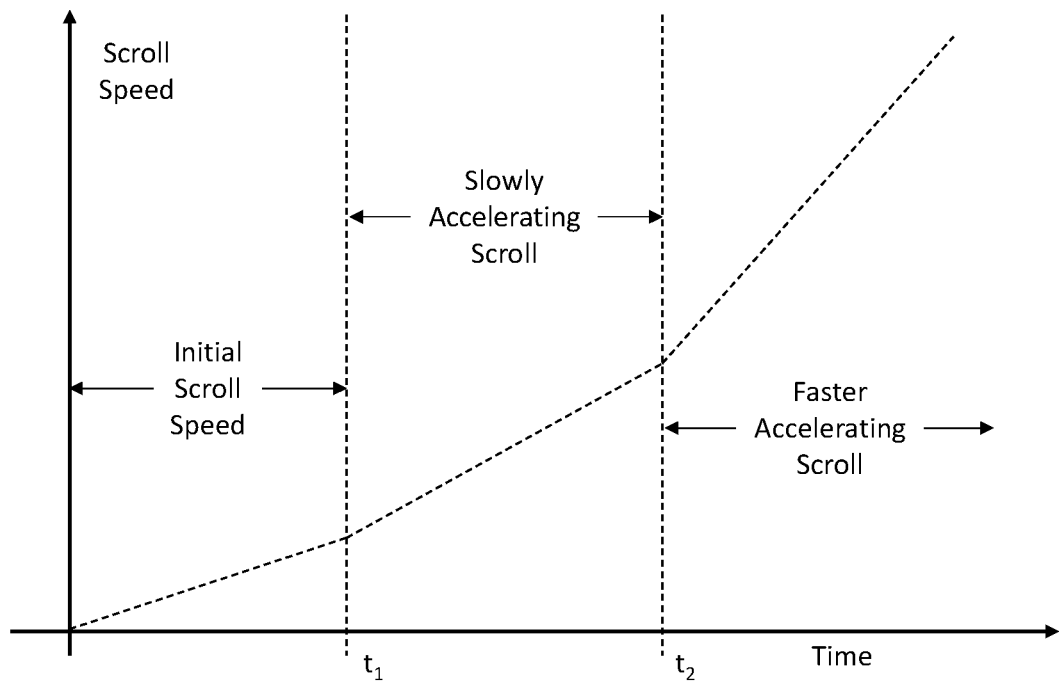
Figure 25F:
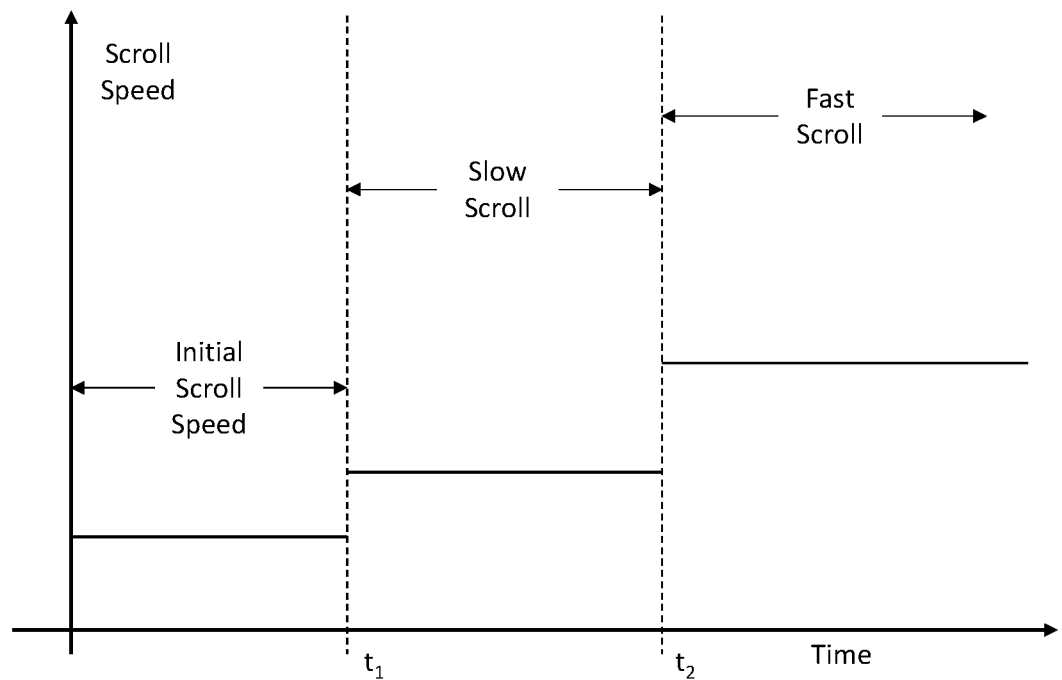

For example, as shown in FIG. 24, the general concept that the scroll speed can be directly proportional to the force applied to the touch overlay plate 195 and the time that the force is applied. In other words, as the force applied increases over time, the scroll speed 2402 increases proportionally over time. The relationship may be linear (as shown in FIG. 24), exponential, or have any other relationship such that the scroll speed increases over time as the force applied to the touch overlay plate 195 increases. It is also to be appreciated that the scroll speed decreases as the force applied to the touch overlay plate 195 decreases over time. FIGS. 25A-25C illustrate the relationship of scroll speed over time given a constantly increasing force, Force1, where Force1 is initially over a given threshold and Force1 is constantly applied and increases over time. In some instances, as shown in FIG. 25A, the scroll speed continues to increase as long as the force, Force1, is applied to the touch overlay plate 195. In other instances, as shown in FIG. 25B, the scroll speed may reach a maximum scroll speed (associated with the force being applied to the touch overlay plate being at or above a threshold), regardless of the force being applied. When the force being applied to the touch overlay plate 195 decreases, the scroll speed may proportionally drop below the maximum scroll speed. In yet other instances, as shown in FIG. 25C, regardless of the force applied to the touch overlay plate 195 (so long as the force applied is over the threshold force, there may be a delay period before the scrolling begins. Once the scrolling begins, it may begin and accelerate at a first rate (slow scroll) for a period of time, and then accelerate more rapidly to faster scroll speeds (fast scroll). This may occur as the applied force stays constant over time and/or as the applied force increases over time. Similarly, as the force applied decreases, the scroll speed may decrease proportional to the applied force, or in discrete steps. Also, as the force is applied to the touch overlay plate 195, there may be discrete periods of scroll speed. For example, as shown in FIG. 25D, there may be a delay period after application of the initial force and as the force increases. After the initial period, there may be a period where the scroll speed jumps to a set constant scroll speed. Then, there may be additional period where the scroll speed continues to jump to set discrete constant values as the applied force is maintained and/or continues to increase. As with the above, as the applied force is decreased the scroll speed may "step down" in discrete steps with periods of constant speed at each step. FIGS. 25E and 25F illustrate other embodiments of force scrolling. In FIG. 25E, scrolling begins and slowly accelerates as soon as the applied force exceeds a threshold. It then reaches a time, t1, where it accelerates more rapidly as the force is maintained and/or increased over time. The scrolling may continue to accelerate as the force is maintained and/or increased over time. Similarly, the scroll rate may decrease as the force applied is lessened. In FIG. 25F, the scroll rate begins at an initial scroll speed regardless of the force applied to the touch overlay plate 195 (so long as the force applied is greater than a threshold force). If the applied force is maintained and/or increased, the scroll speed jumps to another scroll rate that is faster than the initial rate. If the force is maintained and/or increase, the scroll rate may continue to speed up in discrete steps. Similarly, the scroll rate may decrease as the force applied is lessened.

It is to be appreciated that FIGS. 25A-25F illustrate non-limiting examples of the way that the scroll rate can vary according to the time that the force is applied to the touch overlay plate and/or the force applied to the touch overlay plate. In general, every force applied to the touch overlay plate (so long as the force is above a minimum threshold) has an associated scroll speed. However, if an excessive amount of force is initially applied to the touch overlay plate (i.e., a "hard touch"), it may be desired that the scroll speed does not accelerate to the speed associated with the touch applied, but rather the scroll speed initially may be delayed or be a scroll speed associated with a lower applied force for at least an initial period of time. The speed may then ramp up to the scroll speed associated with the force that is being applied after the initial period of time lapses.

FIG. 21 illustrates a flow chart of the operation of the force scrolling function according to some implementations. The steps in the flow chart are stored on the memory 523 and executed by the processor 522 in certain implementations. Beginning at step 2102, a force signal is received from the force sensors 140. Then, at step 2104, a force magnitude associated with the force signal is determined. At step 2106, the force magnitude is compared to an initial threshold force amount to determine if the initial threshold amount is exceeded. Next, in step 2108, an elapsed time that the force magnitude exceeds the initial threshold force amount is measured, and in step 2110, the elapsed time is compared to a minimum elapsed time.

In response to the elapsed time being greater than the minimum elapsed time, a haptic feedback control signal for communicating to the haptic actuator is generated, as shown in step 2112. The haptic feedback control signal causes the haptic actuator 160 to propagate a plurality of pressure waves with a propagation frequency that is proportional to the force magnitude. The propagation frequency refers to the number of times per second the haptic actuator 160 propagates each discrete, sequential pressure wave. The frequency of each pressure wave is a pressure wave frequency and may be set during manufacturing or changed later by the end user or a manufacturer of other equipment that incorporates the switch assembly. In addition, or as an alternative, the pressure wave frequency may be selected from a plurality of pressure wave frequencies based on the signal received by the switch assembly 100.

The haptic feedback may include inaudible pressure waves causing a vibrational output to the user, audible pressure waves causing an audible output to the user, and/or a pattern of inaudible and audible pressure waves that are alternately propagated. And, in implementations in which two or more switch assemblies 100 are coupled to the steering assembly, the haptic feedback may include inaudible and/or audible pressure waves propagated from another switch assembly 100 other than the one to which force was applied by the user. The inaudible pressure waves are pressure waves having a frequency that is below the audible frequency range for humans, and the audible pressure waves are pressure waves having a frequency that is within the audible frequency range for humans. In addition, the audible pressure waves are selected from one or more stored audio output signals. The haptic actuator in certain implementations is a speaker, and the speaker does not make any audible noise when outputting the inaudible pressure waves. For example, the speaker may include a standard voice coil assembly speaker with the cone removed.

In addition, a scroll control signal for communicating to the menu system is generated, as shown in step 2114. The menu system has a plurality of menu options, and the scroll control signal causes the menu system to scroll through the plurality of menu options at a scroll frequency associated with the propagation frequency. The scroll frequency is the same as the propagation frequency in some implementations.

Figure 22A:
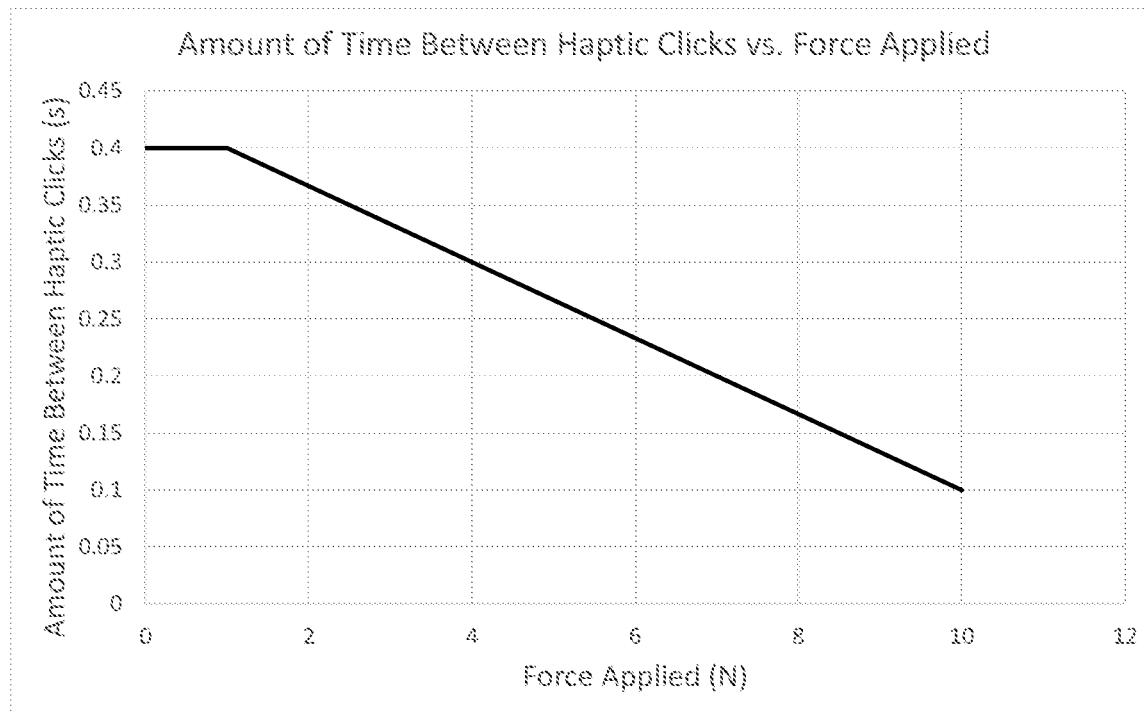
FIGS. 22A and 22B illustrate exemplary graphs showing an amount of time between each discrete pressure wave being output versus a force applied.
Figure 22B:
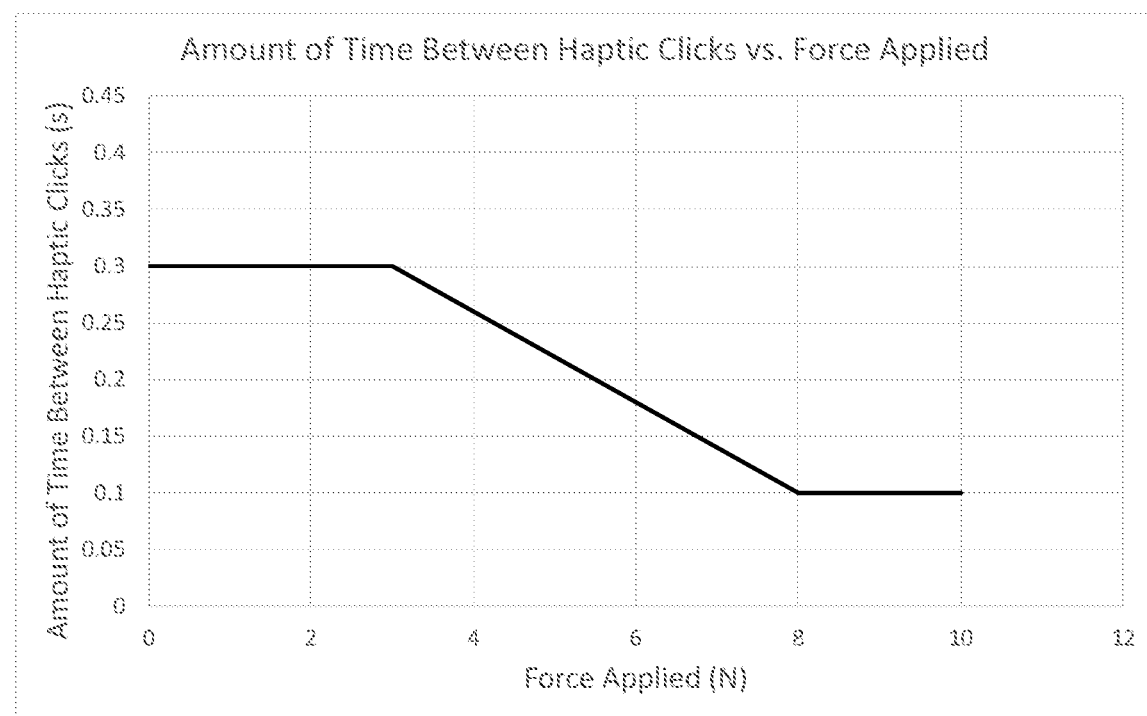

Also, in some implementations, the propagation frequency is selected from a range of frequencies between a minimum frequency and a maximum frequency. A difference between the maximum frequency and the minimum frequency is proportional to a number of menu options of the menu system. For example, the slope of the control frequency at which the pressure waves are output versus the force, and the rate at which scrolling between menu options occurs can be increased or decreased based on the number of menu options and/or based on user or manufacturing preferences. For example, as shown in FIG. 22A, the graph on the left has an initial threshold amount of force of 1 Newton and an initial scroll rate of 0.4 seconds between haptic outputs. The scroll rate decreases to 0.1 seconds with a force of 10 Newtons. FIG. 22B illustrates another graph for which the initial threshold amount of force is 3 Newtons and the initial scroll rate is 0.3 seconds. The scroll rate decreases to 0.1 seconds with a force of 8 Newtons. As used herein, "scroll rate" refers to the amount of time between haptic outputs and scrolling between menu options.

Figure 23:
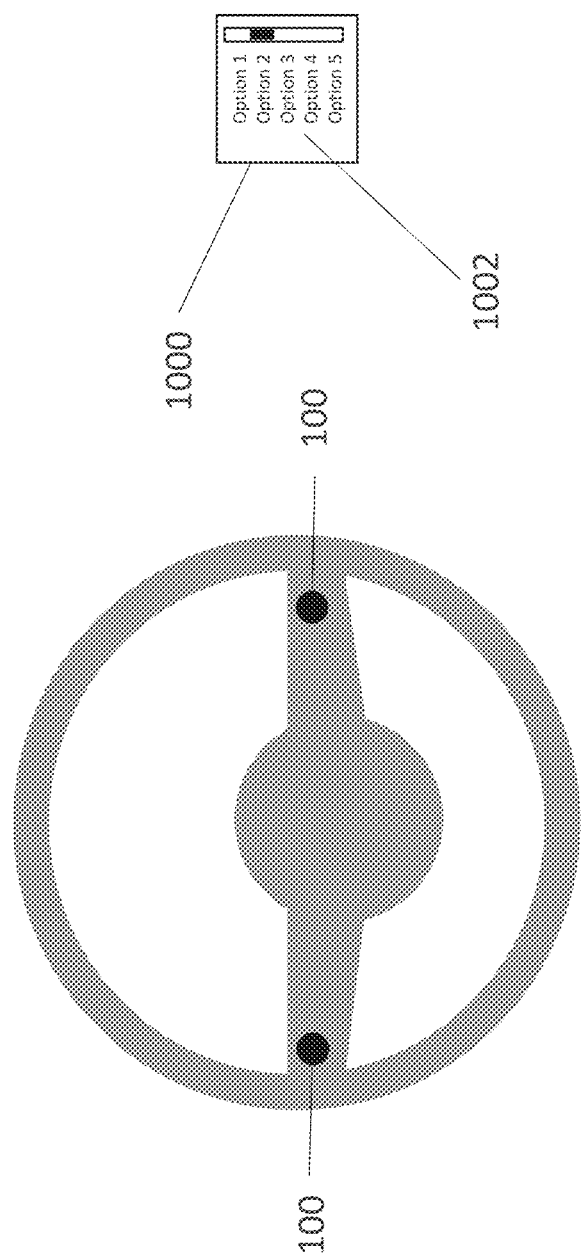
FIG. 23 illustrates a schematic of a steering assembly having two switch assemblies and a display disposed adjacent to the steering assembly, according to one implementation.

As shown in FIG. 23, the switch assembly 100 is associated with a display 1000 for displaying the plurality of menu options 1002. The display 1000 is disposed adjacent the switch assembly 100 in FIG. 23, such as on a dashboard or center console in the vehicle, but in other implementations, the display may be part of the switch assembly or spaced further away from the switch assembly 100.

The menu system includes any system that provides a list of options that can be selected by the user. A non-limiting list of exemplary menu systems includes volume control for an audio system or device, a dropdown list, and an alphanumeric list.

The force scrolling functionality described above has been described with respect to the switch assemblies shown in the accompanying figures. However, the force scrolling functionality may be used with any force sensing system that controls scrolling through a menu system. The force sensing systems include, for example, one or more force sensors, a touch plate that transfers force received by a touch surface of the touch plate to the one or more force sensors, a haptic actuator, a memory, and a processor in electrical communication with the memory, the one or more force sensors, and the haptic actuator. The memory stores the instructions and the processor executes the instructions as described above to provide haptic feedback to the user of the switch assembly as the user scrolls through a menu system.

The terminology used herein is for the purpose of describing particular implementations only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The implementation was chosen and described in order to best explain the principles of the invention and the practical application, and to enable others of ordinary skill in the art to understand the invention for various implementations with various modifications as are suited to the particular use contemplated.

The inevntion claimed is:

1. An electronic device comprising:
    a touch sensitive interface comprising one or more force sensors and a touch surface, the touch surface transferring force received by the touch surface to the one or more force sensors;
    a haptic actuator;
    a memory; and
    a processor, the processor in electrical communication with the one or more force sensors, the haptic actuator, and the memory, wherein the processor executes instructions stored on the memory, the instructions causing the processor to:
        receive a force signal from the one or more force sensors;
        determine a force magnitude associated with the force signal;
        compare the determined force magnitude to an initial threshold force amount and a second threshold force amount that is greater than the initial threshold force amount;
        measure an elapsed time that the determined force magnitude exceeds the initial threshold force amount;
        compare the elapsed time to a minimum elapsed time; and
        in response to the elapsed time being greater than the minimum elapsed time, then:
            if the determined force magnitude exceeds the second threshold force amount, then:
                generate a haptic feedback control signal for communicating to the haptic actuator, the haptic feedback control signal causing the haptic actuator to propagate a plurality of pressure waves at a propagation frequency proportional to a force magnitude lower than the determined force magnitude for an initial period of time, and then after the initial period of time has elapsed, propagate a plurality of pressure waves at a propagation frequency proportional to the determined force magnitude; and
            if the determined force magnitude exceeds the initial threshold force amount and does not exceed the second threshold force amount, then:
                generate a haptic feedback control signal for communicating to the haptic actuator, the haptic feedback control signal causing the haptic actuator to propagate a plurality of pressure waves at a propagation frequency proportional to the determined force magnitude.

2. The electronic device of claim 1, wherein the instructions further cause the processor to generate scroll control signals for communicating to a menu system, the menu system having a plurality of menu options, the scroll control signals causing the menu system to scroll through the plurality of menu options at one or more scroll frequencies.

3. The electronic device of claim 2, wherein the scroll control signals cause the menu system to begin scrolling through the plurality of menu options at a scroll frequency associated with the propagation frequency.

4. The electronic device of claim 3, wherein the scroll frequency is the same as the propagation frequency.

5. The electronic device of claim 1, further comprising the processor delaying generating the haptic feedback control signal when the determined force magnitude exceeds the second threshold force amount.

6. The electronic device of claim 2, wherein the one or more scroll frequencies are prohibited from exceeding a maximum scroll frequency.

7. The electronic device of claim 2, wherein the one of more scroll frequencies are selected from a range of scroll frequencies between a minimum scroll frequency and a maximum scroll frequency, and wherein the minimum scroll frequency and the maximum scroll frequency are set based on the determined force magnitude and a number of the plurality of menu options of the menu system.

8. The electronic device of claim 2, further comprising a display for displaying the plurality of menu options.

9. The electronic device of claim 8, wherein the display is disposed adjacent the touch surface.

10. The electronic device of claim 1, wherein the plurality of pressure waves comprise inaudible pressure waves.

11. The electronic device of claim 1, wherein the plurality of pressure waves comprise audible pressure waves.

12. The electronic device of claim 1, wherein the plurality of pressure waves comprises inaudible and audible pressure waves propagated sequentially.

13. The electronic device of claim 12, wherein at least one inaudible pressure wave is propagated after at least one audible pressure wave is propagated.

14. The electronic device of claim 12, wherein at least one audible pressure wave is propagated after at least one inaudible pressure wave is propagated.

15. An electronic device comprising:
- a touch sensitive interface comprising one or more force sensors and a touch surface, the touch surface transferring force received by the touch surface to the one or more force sensors;
- a haptic actuator;
- a memory; and
- a processor, the processor in electrical communication with the one or more force sensors, the haptic actuator, and the memory, wherein the processor executes instructions stored on the memory, the instructions causing the processor to:
  - receive a force signal from the one or more force sensors;
  - determine a force magnitude associated with the force signal;
  - compare the determined force magnitude to an initial threshold force amount and a second threshold force amount that is greater than the initial threshold force amount;
  - measure an elapsed time that the determined force magnitude exceeds the initial threshold force amount;
  - compare the elapsed time to a minimum elapsed time; and
  - in response to the elapsed time being greater than the minimum elapsed time, then:
    - if the determined force magnitude exceeds the second threshold force amount, then:
      - generate a haptic feedback control signal for communicating to the haptic actuator, the haptic feedback control signal causing the haptic actuator to propagate a plurality of pressure waves at a first constant propagation frequency, and then after the initial period of time has elapsed, propagate a plurality of pressure waves at a second constant propagation frequency, the second constant propagation frequency being greater than the first constant propagation frequency; and
    - if the determined force magnitude exceeds the initial threshold force amount and does not exceed the second threshold force amount, then:
      - generate a haptic feedback control signal for communicating to the haptic actuator, the haptic feedback control signal causing the haptic actuator to propagate a plurality of pressure waves at a first constant propagation frequency.

16. The electronic device of claim 15, wherein the plurality of pressure waves comprise inaudible pressure waves.

17. The electronic device of claim 15, wherein the plurality of pressure waves comprise audible pressure waves.

18. The electronic device of claim 15, wherein the plurality of pressure waves comprises inaudible and audible pressure waves propagated sequentially.

19. The electronic device of claim 18, wherein at least one inaudible pressure wave is propagated after at least one audible pressure wave is propagated.

20. The electronic device of claim 18, wherein at least one audible pressure wave is propagated after at least one inaudible pressure wave is propagated.

* * * * *